United States Patent

Gluth

[15] 3,703,609

[45] Nov. 21, 1972

[54] NOISE SIGNAL GENERATOR FOR A DIGITAL SPEECH SYNTHESIZER

[72] Inventor: Norman P. Gluth, Dallas, Tex.

[73] Assignee: E-Systems, Inc., Dallas, Tex.

[22] Filed: Nov. 23, 1970

[21] Appl. No.: 91,901

[52] U.S. Cl. .................................. 179/1 SA, 331/78

[51] Int. Cl. .............................................. G10l 1/00

[58] Field of Search ..179/1 SA, 15.55, 1 SB; 324/77; 340/148, 152; 331/78; 328/34, 14, 16

[56] References Cited

UNITED STATES PATENTS 3,403,227 9/1968 Malm .................179/15.55 R 3,424,869 1/1969 Anderson ................179/1 SA

*Primary Examiner*—Kathleen H. Claffy

*Assistant Examiner*—Jon Bradford Leaheey

*Attorney*—James D. Willborn and Richards, Harris & Hubbard

[57] ABSTRACT

Disclosed is an electrical-signal synthesizer for converting digitally coded information associated with at least one electrical signal, whose frequency, amplitude or phase may vary, to analog signals whose frequency, amplitude or phase varies in substantially the same manner as that of the at least one electrical signal. More specifically, the synthesizer is operative to convert a digital signal representative of a first analog signal, such as a voice signal, having varying parameters, such as frequency or amplitude, into an analog output signal which varies in substantially the same manner as the first signal, and where the digital signal is composed of consecutive frames of words, and one word of each frame is representative of a fundamental frequency associated with the first signal at an instant of time, and successive words in the respective frame are representative of the energy associated with at least one of a plurality of successive bands or spectrum-segments of the first signal to be reproduced, at the given instant in time, each of the successive bands bearing a predetermined frequency relationship and wherein the synthesis of the output signal is accomplished by generating from the word representative of the fundamental frequency in each respective frame, a stream of digital words representative of the frequency and each of its harmonics at each instant of time and producing therefrom a second stream of digital words which is indicative of the frequency components of the original sound and modulating the second stream with amplitude data corresponding to discrete periods of time and adding the respective digital signals so produced for a discrete period of time and converting the same to an analog signal which is representative of the original voice signal.

14 Claims, 14 Drawing Figures

INVENTOR:
NORMAN P. GLUTH

James D. Willborn
ATTORNEY

INVENTOR:
NORMAN P. GLUTH

ATTORNEY

INVENTOR:
NORMAN P. GLUTH

James D. Dillon
ATTORNEY

INVENTOR:
*NORMAN P. GLUTH*

*James D. Willborn*
ATTORNEY

NOISE SIGNAL GENERATOR FOR A DIGITAL SPEECH SYNTHESIZER

This invention relates to a synthesizer for receiving digitally coded input information and converting such information into analog signals and, more particularly, to a substantially all-digital synthesizer for receiving digitally coded input information relating to speech and synthesizing therefrom a speech signal.

It is recognized in the communications art that the transmission of speech in the form of electrical signals can be accomplished by digital rather than analog means, and certain favorable results are achieved. Usable bandwidth is conserved under certain circumstances, less power is required and digital messages are harder to intercept. A graphic example is that digital voice signals can be interleaved with other data from a spacecraft, thus reducing the requirement for radio-frequency links with the spacecraft.

Scientists have recognized that a description of the speech signal, rather than the speech signal itself, can be transmitted, and the speech signal can be reconstructed from the description. The description includes carefully selected functions or parameters inherent in the speech and from which the speech can be reconstructed. The description is converted to a digital word format, and in this form it requires less bandwidth when transmitted than the original analog speech signal would have required.

Speech data are carried largely by the varying shape of the power density spectrum rather than by the sound-pressure versus time characteristic, as many erroneously believe. Thus, in one system the description of the speech is formed by an analysis of the power spectrum of a first signal by a series of band-pass filters that divide the audio spectrum into a series of adjacent bands. The energy in each band is measured at the output of each filter, and the energy measurement gives a rough, but continuous, description of the power at discrete portions of the incoming speech.

In addition to the channel amplitude-analysis, the analyzer provides data relating to the fundamental frequency or pitch information. Additionally, speech is composed of "voiced" and "unvoiced" sound. The voiced sounds include the vowels and the voiced consonants and are produced by vibrating the vocal cords with air in the lungs. Voiced sounds are composed primarily of harmonics of the frequency at which the larynx vibrates. The fundamental frequencies of the voiced sound lie primarily in a range from about 70 to 350 Hz.

The unvoiced sounds are the consonants formed by the lips, teeth, and/or tongue. They have no definite harmonic pattern, but consist essentially of frequencies randomly distributed throughout the audio spectrum and varying in amplitude in accordance with the sound being reproduced. Thus, the description of the speech includes the pitch frequency, amplitude information relating to bands of the voice-frequency spectrum, an indication that unvoiced sounds are present, and amplitude data relating to the unvoiced sounds.

To synthesize the voice with a channel synthesizer, a series of band-pass filters similar to those described above is used in cooperation with the output of a buzz or hiss generator and balanced modulators to reconstruct intelligible speech.

Voice signal synthesizers utilizing filters are subject to at least two major objections. Since band-pass filters with infinitely short cutoff are not technically feasible, energy from one channel often appears in the next adjacent channel output, thereby producing a substantial amount of distortion. Additionally, a filter cannot have an infinitely short response time, and accordingly, energy is stored in each respective filter such that oscillations are set up in the filter circuit, again producing distortion of the voice-signal produced. Also, the use of a plurality of filters results in a construction that is too large and too heavy for applications where size and weight are critical factors, as in a space vehicle. Filters also require large amounts of power input with respect to the power of the output signal produced, since substantial losses are normally associated with filters. Still further, the error associated with the use of filters prevents the repeatability, when required, of a particular signal with a requisite degree of accuracy.

Channel analyzers of the type described do not possess the requisite degree of flexibility required for present day application. It may be desirable in certain situations to shift the phase of a single harmonic or to modulate a harmonic with a second signal or to completely eliminate a particular harmonic in a given situation, thereby to improve or change the quality of the signal which is to be synthesized. For example, in some deep-sea exploration vehicles an atmosphere is utilized which includes a high percentage of helium. The propagation of sound in helium is distorted with respect to propagation of the same sound in air, thus producing an unnaturalness in the sound in the vehicle. If this distortion could be compensated for by a synthesizer which is capable of altering the pitch of the sound produced to compensate for the distorted propagation, it would be possible to thereby return to the sound of naturalness which has been lost.

Scientists and engineers have for some extended period of time sought to build a completely all-digital, voice-signal synthesizer but have previously had only limited success. Any digital portions of synthesizers presently known require extensive memory apparatus which limits the utility of the synthesizer with which the digital apparatus is associated. A digital synthesizer which operates in real-time, thus avoiding the requirement for extensive memory apparatus, would be useful in many applications where synthesizers could not have been used previously.

An object of this invention is to provide an improved electrical-signal synthesizer.

Another object of this invention is to provide an improved synthesizer for receiving digitally coded input information and converting such information into analog signals which vary in accordance with a first signal from which the input information is coded.

Still another object is to provide an electrical-signal synthesizer operative in response to a digitally coded input signal representative of an original electrical signal having at least one varying parameter, to produce an analog output signal having at least one parameter that varies in accordance with the at least one varying parameter of the original signal.

Yet another object is to provide an electrical-signal synthesizer which is improved through the use of substantially all digital techniques to accomplish the synthesis.

A further object is to provide an electrical-signal synthesizer which reproduces the analog signal with a higher degree of accuracy than that of other synthesizers.

A still further object is to provide an electrical-signal synthesizer which is smaller in size and has reduced weight with respect to other synthesizers.

Another object is to provide a new and improved synthesizer for receiving digitally coded information relating to the frequency, amplitude or phase of original signals and converting the coded information into analog signals of substantially the same frequency, amplitude or phase as the original signals.

Still another object is to provide a synthesizer for converting consecutive frames of digital words, where the consecutive frames contain frequency and amplitude information relating to a frequency and amplitude varying original signal at consecutive, predetermined, instants of time, into an analog signal having the same frequency and amplitude as the original signal at the respective instant of time.

An important object of the invention is to provide a new and improved synthesizer for receiving digitally coded information of fundamental parameters of speech and converting the digitally coded information into analog signals.

Another object is to provide a synthesizer for converting digitally coded information relating to the fundamental parameters of speech, which information consists of consecutive frames of digital words, which frames include frequency and amplitude information relating to the speech at consecutive, predetermined, instants of time, with one word of each frame containing information relating to the fundamental frequency of the speech at one instant of time, and the other words of each frame containing amplitude information relating to predetermined frequency bands or spectrum-segments, each of the bands having a predetermined relationship to at least one fundamental frequency at the one instant of time.

Yet another object is to provide a substantially all-digital, voice-signal synthesizer which operates in real-time without the use of extensive memory apparatus.

Still another object is to provide a synthesizer for converting digitally coded voice information into analog signals, wherein the synthesizer provides improved-quality, voice reproduction through the use of digital apparatus.

Still another object is to provide a synthesizer for receiving serially presented, digitally coded information which is indicative of frequency, amplitude or phase of original signals at predetermined instants of time and converting such digitally coded information into at least one digital signal, in parallel form, indicative of any combination of frequency, amplitude or phase relations of the original signals at consecutive instants of time.

Additional objects and advantages of the invention will be readily apparent from the reading of the following description of devices constructed in accordance with the invention, and reference to the accompanying drawings thereof.

Referring to the drawings.

Figure 1:
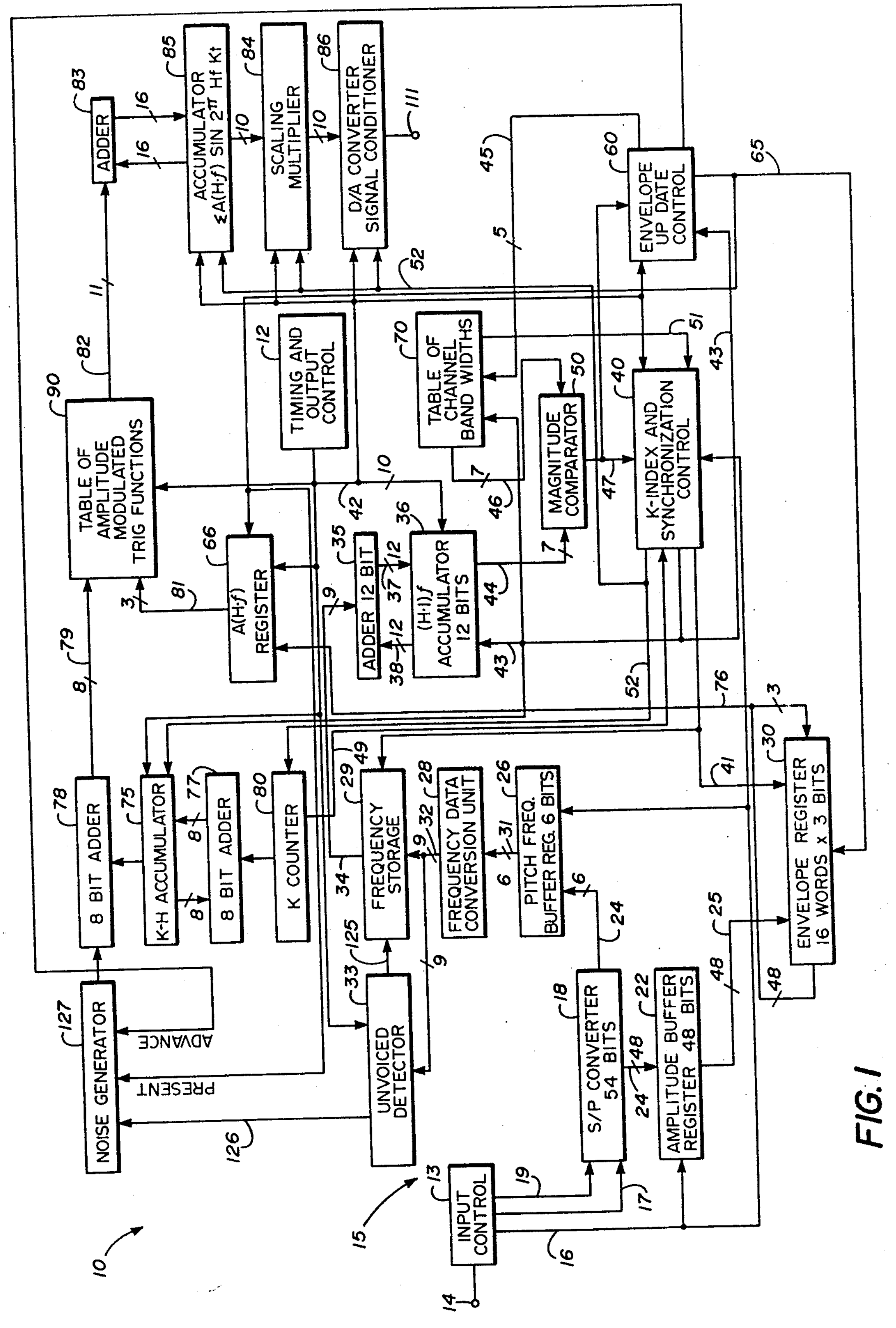
FIG. 1 is a block diagram of a signal synthesizer embodying the invention.
Figure 2:
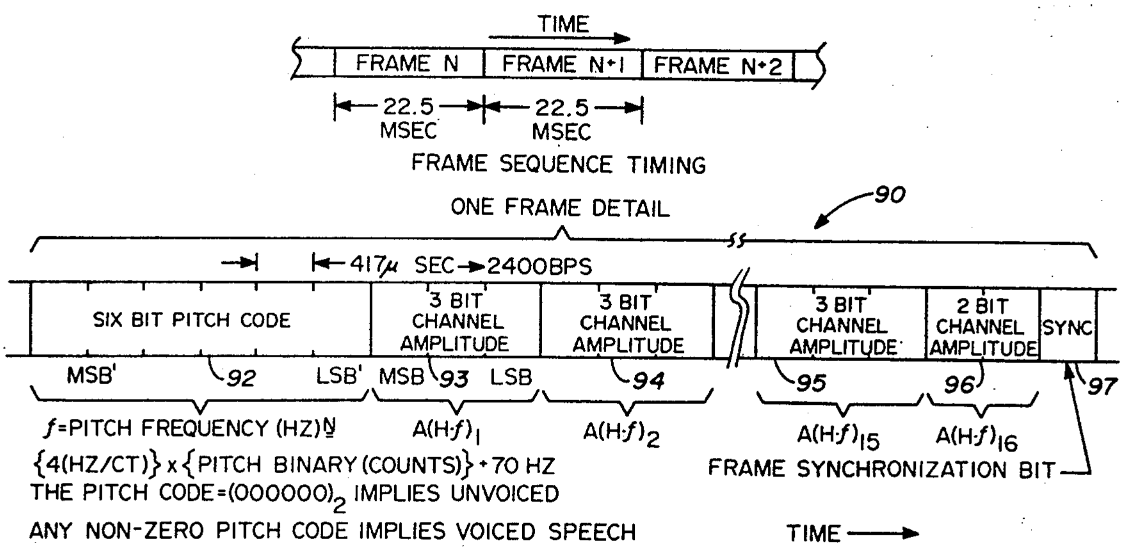
FIG. 2 is a diagrammatic illustration of a digitally coded, serial-input signal coupled to the synthesizer of FIG. 1.

Referring now particularly to FIGS. 1 and 2 of the drawing, the illustrated embodiment of the invention is a synthesizer 10 used to convert digitally coded information relating to a first analog signal into analog signals which may in turn be used to reproduce the first signal.

Voice analyzers for translating speech into digital code or signals are well-known. A digital signal produced by one of these analyzers may comprise, as illustrated in FIG. 2, consecutive frames F, such as 90, of digital words containing information relating to the fundamental parameters of speech at consecutive, predetermined, spaced instants of time. In the analyzer described, digital signals are transmitted at the rate of 2400 bits per second. Additionally, each frame contains information relating to whether the speech at a particular instant of time is voiced or unvoiced, a definition of the fundamental frequency of the speech at the given instant to which the frame is related if the sound is voiced sound, and the amplitude of the energy level of a predetermined, consecutive series of bands or spectrum-segments spaced within the band of voice frequencies, whether the speech is voiced or unvoiced at that time. Thus, each frame 90 includes 17 words, the first being a six-bit word, 92, coded to identify the fundamental frequency of the voiced sound or to indicate that there is an absence of voiced sound at an instant of time. Serially presented, following the first word, are 15 consecutive three-bit words, such as the three-bit words 92 – 97, each being coded to indicate the amplitude of the energy associated with a respective predetermined, consecutive band or spectrum-segment of the band of voice frequencies at the one instant of time with which the frame is associated. The seventeenth word, 96, similarly, provides the amplitude information for the sixteenth band, but as opposed to the other words in the series, it does so with two bits; the last bit of the frame being a synchronization bit. For example, the first three-bit word 93 indicates the amplitude energy of the speech in the band between 200 Hz to 332 Hz and so on with the last word 96 indicating the amplitude of the energy in the spectrum-segment between 3,331 Hz and 3,820 Hz. The consecutive bands of the frame related to a respective word each increase in width with respect to frequency in a predetermined, selected manner, for example, the expansion may be on a logarithmic scale.

The synchronization bit 97 serves to maintain proper synchronization of the timing relationships between the operation of the various circuits of the voice synthesizer 10.

The synthesizer of this invention is a special purpose computing device. It receives the input information at a rate of 2,400 bps, and the bit stream consists of serially arranged 54-bit frames of the type previously described.

To fully understand the method of reconstruction of the original, analog signal from the description of the sound represented by that signal, the method of computation must be explored. The general form of the computation is as follows:

$$X_{(tk)}=\frac{1}{H}\sum_{H\cdot f=1}^{L}A_{(H\cdot f)}\left[\frac{\text{Sin }2\pi(H\cdot f)(KT)}{C}\right] \quad (1)$$

In this equation $X_{(tk)}$ is the summation of a sequence of computations relating to the amplitude and frequency of the analog signal to be constructed, where the summation computation is performed for $K$ specific time instants. The term $f$ is the pitch or fundamental frequency in Hz for which the computation is performed, and the term H represents the harmonic number (i.e., 1, 2, 3, . . . N) for the harmonics associated with the pitch frequency. The term $A_{(H.f)}$ represents the amplitude of the envelope during a particular time-instant of a fundamental frequency (where $H.f = 1$) or a sine-wave harmonic (for values of $H.f$ in excess of 1) of the sound to be generated. The term $T$ is an incremental unit of time associated with the computation of the amplitude of one point for one particular harmonic; $L$ represents the greatest product of H.f that is less than 3,820 Hz; $C$ represents a scaling factor relating to the number of computations to be performed during the cycle of the basic pitch period; and $K$ represents a time index related to the number of computations to be performed with respect to a particular cycle of the pitch frequency. The terms $K$, $T$, and $C$ are fully explained in the following portions of the disclosure. The upper limit of the band of frequencies considered has been selected, in the embodiment disclosed, as 3,820 Hz. This use of this upper limit, as opposed to 4,000 Hz, facilitates computation and does not substantially effect the intelligibility or quality of the output produced.

In its expanded form, Equation (1) above can be written as follows for successive periods of time:

$$X_{(t1)}=\frac{1}{H}\Big[\overbrace{A_{(f)}\text{ Sin }\frac{2\pi fT}{2^8}}^{a}+\overbrace{A_{(2f)}\text{ Sin }\frac{2\pi(2f)T}{2^8}}^{b} + \overbrace{A_{(H\cdot f)}\text{ Sin }\frac{2\pi(H\cdot f)T}{2^8}}^{m}\Big] \quad (2)$$

$$X_{(t2)}=\frac{1}{H}\Big[\overbrace{A_{f}\text{ Sin }\frac{2\pi f(2T)}{2^8}}^{a_1}+\overbrace{A_{(2f)}\text{ Sin }\frac{2\pi(2f)(2T)}{2^8}}^{b_1} + \overbrace{A_{(H\cdot f)}\text{ Sin }\frac{2\pi(H\cdot f)(K\cdot T)}{2^8}}^{m_1}\Big] \quad (3)$$

$$X_{(tk)}=\frac{1}{H}\Big[\overbrace{A_{f}\text{ Sin }\frac{2\pi f(KT)}{2^8}}^{a_n}+\overbrace{A_{(2f)}\text{ Sin }\frac{2\pi(2f)(KT)}{2^8}}^{b_n} + \overbrace{A_{(H\cdot f)}\text{ Sin }\frac{2\pi(H\cdot f)(K\cdot T)}{2^8}}^{m_n}\Big] \quad (4)$$

Figure 5:
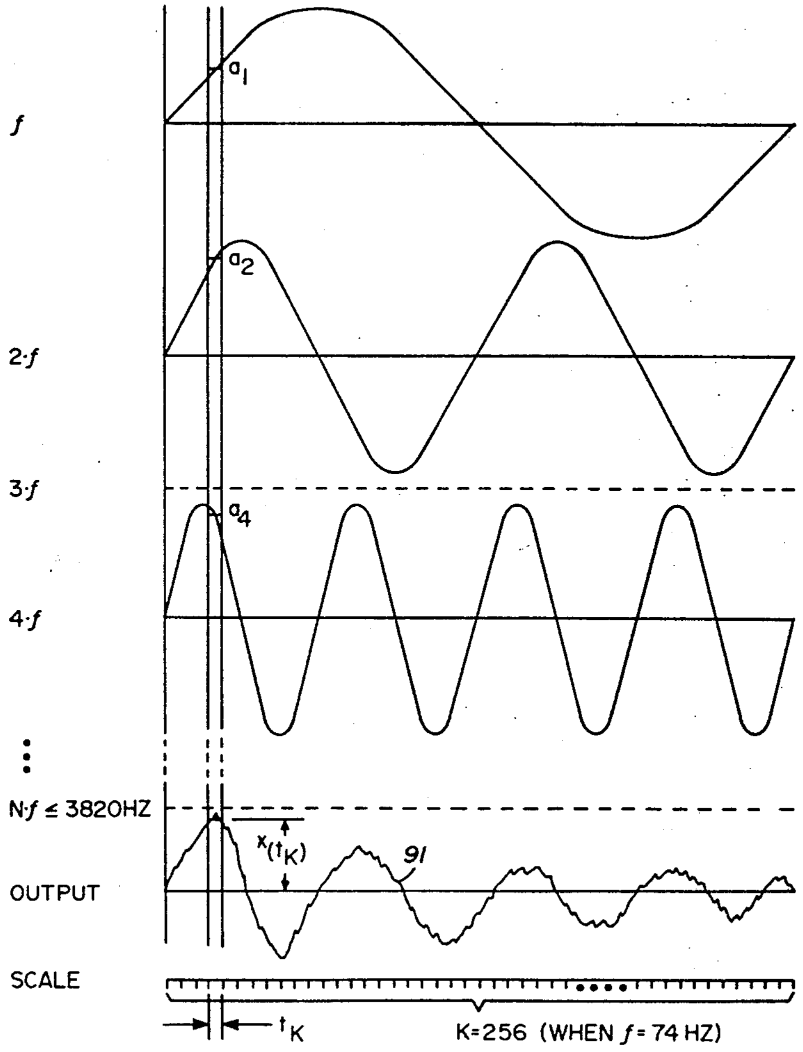
FIG. 5 is a graph illustrating the basic method of computation.

Referring now particularly to FIG. 5, a pitch or fundamental frequency f is illustrated with each of its harmonics ($2f$, $3f$, $4f$ . . . $n.f$) included in a speech-band of frequencies having a top frequency of 3820 Hz. For purposes of illustration, an output curve 91 is shown which theoretically represents the summation of the pitch frequency with each of its harmonics falling within the prescribed speech-band.

In the embodiment described, the lowest pitch-frequency which is dealt with is 74 Hz, since this corresponds approximately with the lower-end of the band of fundamental or pitch frequencies. It has been decided arbitrarily to compute 256 points during any one complete cycle of a 74 Hz signal and 256 points for each harmonic thereof where the points computed for the harmonics are equally spaced over a time span equal to the period of the fundamental; thus a representative scale, where the pitch frequency is equal to 74 Hz, is set forth in FIG. 5, and, as will be fully explained in the material that follows, the pitch frequency on which a computation is based will change, but the computing rate of $K = 256$ will remain constant. In other words, at a pitch frequency of 74 Hz, 256 computations are made in a time span of approximately 13.5 m sec. (the period of one cycle of a 74 Hz signal). For each harmonic of the 74 Hz pitch frequency, 256 computations are made in the same time span; thus, the time-duration of a point to be computed (for the 74 Hz fundamental and each of its harmonics) will be:

$$13.5 \text{ m sec.}/256 = 52.7\ \mu\text{ sec.}$$

Since the upper-limit of the voice-band for this embodiment is set at 3,820 Hz, with a fundamental frequency of 74 Hz there will be 3820/74 or 51 harmonics lying in the voice-band. The total time of the computation is 52.7 $\mu$ sec., thus, the value of a point for each harmonic or the fundamental is computed in approximately 52.7/51 or 1.03 $\mu$ sec.

Examining now the Equations (2), (3), and (4) set forth above with respect to FIG. 5, it can be seen that the amplitude of the output curve 91 at a particular time increment $t_x$ is computed by providing the correct values of the unknowns and solving a respective equation, thus, if $t_x = t_2$, Equation (3) provides a value for the amplitude of the output signal at the second increment of time ($t_2$). In Equations (2), (3), and (4), the portions of the respective equations labeled $a$, $a_1$, . . . $a_n$ represent the first harmonic component of the computation, $b$, $b_1$, and $b_n$ represent the second harmonic component, and similarly m, $m_1$, and $m_n$ represent the mth harmonic of the computation. Upon close examination, it will also be apparent now that if the respective components $a, a_1, \ldots a_n$ are plotted for respective time periods K, that the pitch frequency will be reproduced and that as the number of increments K are increased, the accuracy of the reproduction of the sine wave representing the pitch frequency is improved.

The pitch frequencies utilized in this device fall in the range from 74 to 310 Hz. Those skilled in the art will recognize that the band of pitch frequencies is normally considered to be approximately 74–330 Hz, but this band can be modified slightly without seriously affecting the quality of the sound produced (when voice is the object) and without affecting operations of the machine. Consider now a specific example of a computation for the pitch frequency of 310 Hz. The expansion of the general Equation (1) can be summarily written, as follows:

$$X_{(t_1)}=\frac{1}{12}\overbrace{\left[\overbrace{A_{(310)}\ \mathrm{Sin}\ \frac{2\pi T}{2^8}}^{1.03\ \mu\mathrm{sec.}}+A_{(620)}\ \mathrm{Sin}\ \frac{2\pi T}{2^8}+A_{(3410)}\ \mathrm{Sin}\ \frac{2\pi T}{2^8}\right]}^{12.38\ \mu\mathrm{sec.}} \quad (5)$$

$$X_{(t_2)}=\frac{1}{12}\left[A_{(310)}\ \mathrm{Sin}\ \frac{2\cdot 2\pi T}{2^8}+A_{(620)}\ \mathrm{Sin}\ \frac{2\cdot 2\cdot 2\pi T}{2^8}\ \ldots\right. \quad (6)$$

$$X_{(t_{255})}=\frac{1}{12}\left[A_{(310)}\ \mathrm{Sin}\ \frac{255\cdot 2\pi T}{2^8}+\ \ldots\right. \quad (7)$$

$$X_{(t_{256})}=\frac{1}{12}\left[A_{(310)}\ \mathrm{Sin}\ \frac{256\cdot 2\pi T}{2^8}+\ \ldots\right. \quad (8)$$

(Spectrum component segment (8.) adds to zero for the value $K=256$, since the time $t_1$ is taken as $t_0+1$.)

The total computation time for computing the components $X_{(t_1)}, X_{(t_2)} \ldots X_{(t_{256})}$ would be only 3.17 milliseconds, since there are only 11 computations, i.e., 12 possible harmonics of the pitch frequency that lie between 310 Hz and 3,820 Hz (3,820/310 = 12). The total computation time for any $X_{tk}$, where the pitch frequency is 310 Hz, is 12.38 $\mu$ sec., thus the total computation time for all the K time-segments at 310 Hz pitch frequency would be 3.17 milliseconds ($12.38 \times 10^{-6} \times 256 = 3.17 \times 10^{-3}$), as compared to the total computation time of 13.5 milliseconds when the pitch frequency was 74 Hz. The computation time required to compute each element of the Equations (5) – (8) is still 1.03 microseconds, as with the previous equations.

Each frame of the digitally coded input information (the description of the sound) contains the information necessary to accomplish the general computation set forth above for one pitch frequency and for each harmonic thereof. Referring particularly to FIG. 2 and to Equations (2), (3), and (4), the six-bit word 92 identifies the basic pitch-frequency f relating to a frame, and each three-bit word, such as 93, contains the amplitude information $A_{(H,f)}$ relating to at least one harmonic which falls within one of a preselected series of divisions of the voice-band or spectrum. Becuase of the spacing of the preselected divisions or bands of the voice-band, and the spacing of the harmonics relating to the pitch frequency identified, more than one harmonic may lie within a particular division or there may be no harmonic in the division. Where more than one harmonic occurs in a division, the $A_{(H,f)}$ information represented by a word is representative of the total power in the harmonics falling in this division of the original signal which was coded.

To provide an adequate representation of the voice spectrum of the original signal at the output of the synthesizer 10, the frame must be greater in duration than the largest pitch period associated with a fundamental frequency. In the embodiment disclosed, the frame repetition rate is 22.5 m sec., and the frames are presented without interruption, in series.

Referring now to FIG. 1, the digitally coded input information is applied to an input terminal 14 which is coupled to an input control-unit 13. The input control-unit 13 operates to synchronize the input information to the input means located generally at 15 and including a serial-to-parallel converter 18, a 48-bit, amplitude-data buffer-register 22, a six-bit, pitch-frequency buffer-register 26, a logic-unit 28 for converting digital, frequency-related, input data to binary words, and a frequency-data storage register 29. The input control 13 generates a 2,400 bit-per-second (bps), square wave, pulse-train or clock signal which is substantially independent of other timing apparatus within the synchronizer 10 and this clock signal is coupled to the serial-to-parallel converter 18 by a lead 19. The serial input-data applied to the input control 13 is transferred from the input control, over line 17, to the converter 18, and each frame of the serial input-data is synchronized with a clock pulse from lead 19, on a bit-by-bit basis, in the converter such that the data received by the converter over line 17 is synchronized to the operation of the input means. Additionally, a signal corresponding to the synchronous bit associated with each frame of input data is coupled through a lead 16 to the amplitude buffer-register 22, to the pitch-frequency buffer-register 26, and to the K-index and synchronization control unit 20. The signal appearing on line 16 is essentially a pulse-train with a repetition rate of 44.44 bps or one pulse every 54 counts of the 2,400 bps clock.

Figure 6:
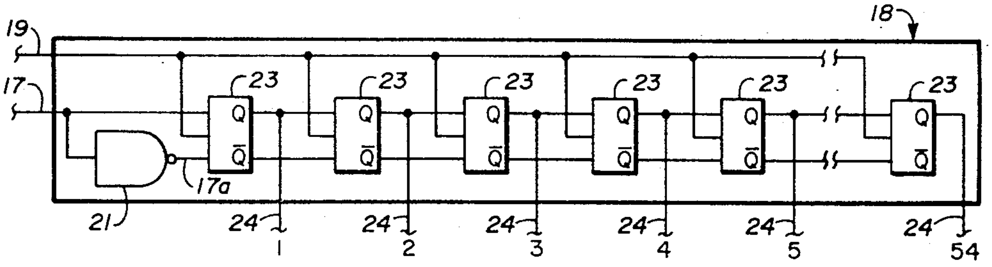
FIG. 6 is a simplified schematic drawing of the serial-to-parallel converter of FIG. 1.

Referring to FIG. 6, the serial-to-parallel converter 18 is of a type well-known to the art relating to digital computer technology.

The converter 18 utilizes flip-flops which are also well-known, and those skilled in the art will recognize that a flip-flop has first and second input connections, first and second output connections, generally labeled Q and $\overline{Q}$ ("not Q"), a clock input which operates in response to a pulse applied thereto to set the data at the input to the output, and a reset connection which operates in response to a pulse applied thereto to clear the output of the flip-flop. Flip-flops are too well-known in the art to require more than the general description provided. Additionally, a one or high referred to herein implies the presence of a DC voltage of a given magnitude, and a low or zero refers to the absence of a voltage. In the embodiment illustrated, a voltage of 5 volts DC is used as a one. Essentially, a first output connection of each flip-flop corresponds to the first input connection of the same flip-flop, and similarly, a second output connection corresponds to the second input connection, such that when a timing pulse is applied to a clock input of the flip-flop, the output changes state to a condition corresponding to the condition at the input at the time the timing pulse was applied.

The serial data on line 17 is coupled to the input of converter 18 wherein the serial signal is divided into two parallel paths 17, 17*a*, one path 17a including an inverter 21, and each of the parallel paths are applied directly to respective input connections of a first flip-flop 23 of a group of 54 parallel-connected, flip-flops 23. The first flip-flop 23 includes a first input connection to which line 17 is coupled and a second input connection to which line 17*a* is coupled; however, the second coupling is through the inverter 21, such that if one bit of the input serial data is a one, the one is applied directly to the first input-connection, and a zero is applied to the second input connection. Conversely, if a zero is applied to the first input connection, a one is applied to the second input connection. The output connections of the first flip-flop 23 are coupled to the input connections of the second flip-flop 23 and so on through the remaining flip-flops of the group. The lead 19 is coupled to the clock input of each flip-flop 23 in the string. Thus, where each set-reset input is pulsed simultaneously at a rate of 2,400 pulses-per-second by the clock signal on line 19, the 2,400 bps input data on line 17 is stepped serially through the flip-flops 23, and at the end of each 54 consecutive steps, the serial bits clocked into the first output-connection of each flip-flop corresponds to a respective bit of the 54-bit frame of input data, as shown in FIG. 2. Thus, a lead, such as 24, is coupled to the first output-connection of each respective flip-flop 23 to provide the desired parallel-data output from the converter 18.

As shown in FIG. 2, the first bit of data to enter the converter 18 with respect to time is the first bit of the six-bit word related to the pitch frequency of the frame. The last word entering the converter 18 is a three-bit word representative of the energy level of the harmonics located in the 16th segment of the voice band, and this three-bit word includes a synchronization bit which is actually the last bit in the frame. For this reason, the amplitude of the energy level associated with this last word is treated in the synthesizer as having only two significant bits.

Figure 7:
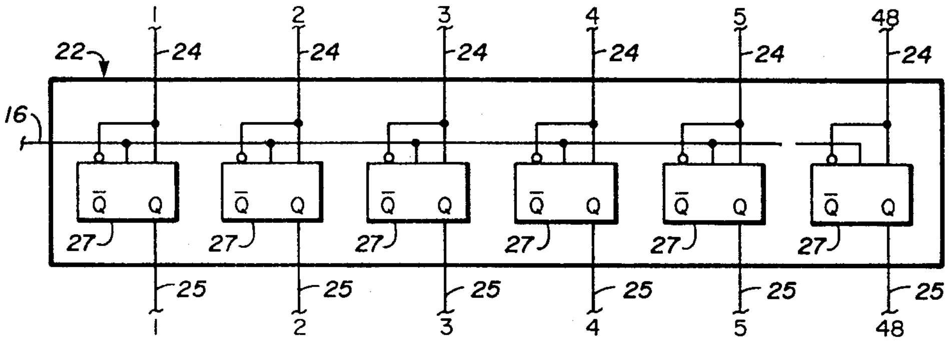
FIG. 7 is a simplified schematic drawing of the amplitude buffer register of FIG. 1.

Referring now to FIG. 7, the 48-bits of amplitude information are coupled to the amplitude buffer-register 48 through parallel leads 24 and are coupled interiorly of the register to input of flip-flops 27. As previously explained, a signal on line 16 corresponds to the occurrence of the synchronization bit in each word frame, such as 190 of FIG. 2, and this signal is applied to the clock input of each respective flip-flop 27, simultaneously. Thus, the output of each flip-flop 27 is set in accordance with the data on its input and is set at a time when a complete frame of data is available in parallel-form from the serial-to-parallel converter 18; therefore, the parallel data is stored in buffer-register 22 for a time-period corresponding to the frequency of occurrence of the synchronization pulse on line 16 or 22.5 milliseconds. A separate lead, such as 25, is coupled to the noninverted output (Q) connection of each flip-flop 27 and is coupled to the envelope register 30 (FIG. 1) for use therein at a subsequent time. The buffer-register 22 operates to store the amplitude data while a new frame of serial input data is being converted to parallel form by converter 18 and while the last frame of data stored in the register 22 is being processed by the other circuitry of the synthesizer 10.

Similarly, the six bits of pitch frequency information of each frame is coupled through parallel leads, such as 24, to a pitch frequency buffer-register 26 (FIG. 1). Refer to FIG. 1. Except for the number of flip-flops used therein, the register 26 is substantially identical in operation and construction to the register 22. The output of register 26 includes six parallel lines 31 which are coupled to a frequency data conversion unit 28.

The frequency data conversion unit 28 of FIG. 1 operates to convert the digitally coded input information to binary format and operates to change the frequency format arrangement of the digitally coded input information into a binary format usable in the digital equipment of the synthesizer. Specifically, channel analyzers available at present code the pitch-frequency data substantially in accordance with the following code:

TABLE 1

| Word | Code | Frequency Value (Hz) (Approximate) |
|---|---|---|
| 1 | 000000 | 0 (Special Code) |
| 2 | 000001 | 74 |
| 3 | 000010 | 78 |
| 4 | 000011 | 82 |
| 5 | 000100 | 86 |
| 6 | 000101 | 91 |
| 7 | 000110 | 95 |
| ↓ | ↓ | ↓ |
| 64 | xxxxxx | 310 |

As will be explained in the following description, it is important to obtain even multiples of the word of the description relating to a pitch frequency in order to obtain binary-language numbers relating to the harmonics of the pitch frequency of a particular frame. It is common computing practice to double a binary number in the manner illustrated by the following example:

| | | |
|---|---|---|
| 000001 | = | 1 |
| +000001 | = | +1 |
| 000010 | = | 2 |

Referring to Table 1, set forth above, it is easy to see that if word 2 is doubled in accordance with the example, i.e., adding the coded word 000001 to itself would result in a word in the code of Table 1 that would correspond to 78 Hz and not 148 Hz (2*f*). Thus, the conversion from the coded information to standard binary arithmetic units is necessary. A frequency-data conversion unit useful in the embodiment illustrated and for the purpose described is manufactured by the National Semiconductor Company (Model MM422) of Santa Clara, California.

In the process of converting the coded data to binary arithmetic units, still another result is obtained. Referring to Table 1, it is apparent that there exists a substantially linear change in frequency between words 2–64, but not between words 1 and 2. By converting the coded data to the standard binary arithmetic terms, the nonlinear change which would otherwise disrupt computations is rendered insignificant.

Additionally, the frequency data conversion unit 28 operates to expand the coded data to a nine-bit word, as opposed to the six-bit word of the coded input data. It will be apparent to those skilled in the art that a six-bit word of standard binary arithmetic would not add to 310 Hz. For instance, a standard six-bit binary computing word can be expanded as follows:

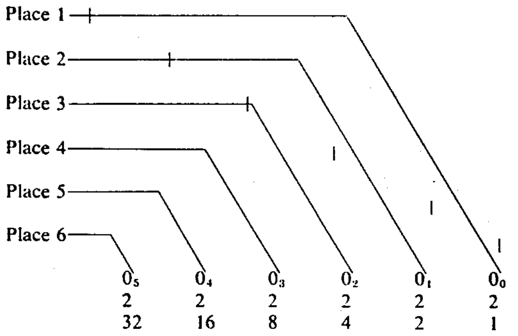

It is common knowledge that a one in, for example, place 3 (000100) represents the number 4 to the base 10; a one in place 3 and in place 2 (000110) would be the number 6 to the base 10; and so on until there is a one in each of the places 1–6 (111111) whereupon the number represented is 63, which is also the maximum number that can be represented with one six-bit word; thus, if the binary number is expanded to nine bits (in lieu of six), the binary number for 310 is easily formed (100110110), and 9 places is the first possible combination enabling a representation of the number 310. It follows that the frequency data conversion unit 28 has nine, parallel, output-leads, such as 32, and these leads couple the conversion unit to the frequency storage unit 29 and to the unvoiced detector 33.

The frequency storage unit 29 is a storage register including flip-flops and is similar in construction and operations to the amplitude buffer-register 22 and the pitch frequency buffer-register 26, except that in the storage unit 29 there are at least nine flip-flops, one corresponding to each bit, and a respective one of the leads 32 are coupled to the input of each respective flip-flop and the noninverted output of each flip-flop is coupled through a respective lead, such as 34, to a 12-bit adder 35. The frequency storage unit 29 operates to store the data input thereto from the conversion unit 28 until such time as the pitch frequency reaches the end of a cycle, thus enabling the synchronization of the data out of the input means 15 with the operation of the other circuitry of the synthesizer 10. The flip-flops of the frequency storage unit 29 are gated by a signal from the K-index and synchronization control unit 40, as will be shown in the following description, to cause the data stored in the storage unit to be transferred to the adder 35. The timing of the gating signal is set to prevent the interruption of the computation cycle by the introduction of new data into the computing portion of the synthesizer 10 at an inopportune moment.

The 12-bit adder 35 and the accumulator 36 operate to produce binary words corresponding to certain, successive harmonics of the pitch frequency of a respective frame.

The timing and output control unit 12 is the master timing unit for the computing portion of the synthesizer 10. The unit includes a crystal-controlled oscillator and a series of flip-flops which serve as frequency dividers in a manner which is well-known to those skilled in the art, such that ten clock-signals are available from the control unit 12 for timing the various circuits of the synthesizer 10. In the embodiment disclosed, clock 0 is 7.76 MHz pulse-train, clock 1 is 3.88 MHz, clock 2 is 1.94 MHz, clock 4 is 0.97 MHz, and clock 8 is 0.425 MHz, and through connection to the inverted output of each respective flip-flop of the divider, 5 additional timing signals, each 180° out of phase with a respective one of the above clocks 0–8, are also available. Additionally, where required, combinations of the above disclosed timing signals are used to generate still other timing signals. For instance, a 1.03 $\mu$ sec clock is generated by the combination of clock 2 and clock 4. In FIG. 1, the timing pulses are coupled to the various units by certain ones of ten separate leads, such as 42.

Figure 8:
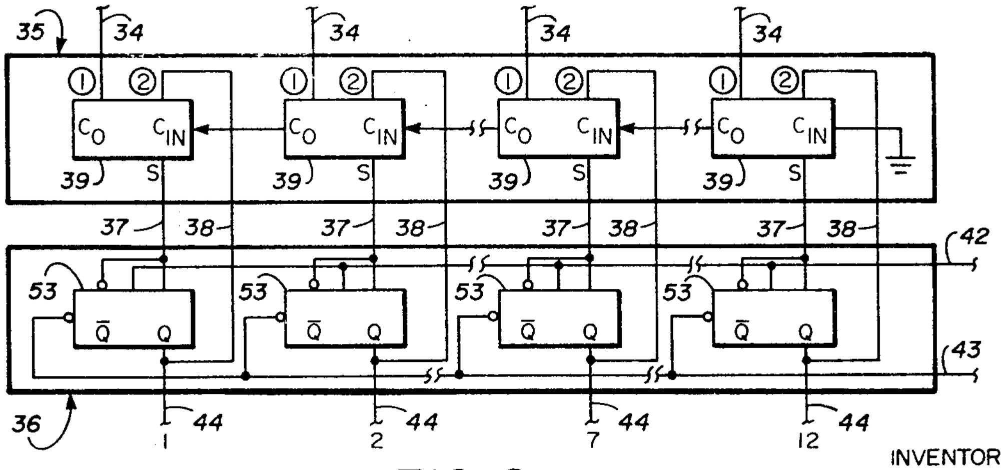
FIG. 8 is a simplified schematic drawing of the 12-bit adder-accumulator combination of FIG. 1.

Each bit of the nine-bit word is transferred from the frequency storage unit 29 to the adder 35 over parallel leads, such as 34, and is applied to a respective adder section, such as 39 in FIG. 8. There are more adder sections (12) than there are input data bits (nine) to allow room for binary expansion of the number. The input data bits are coupled to the adder inputs corresponding to the nine least significant bits. Each of the adder sections 39 is of a type which is well-known, and a Fairchild integrated circuit chip model 9304, manufactured by Fairchild Semiconductor of Mountain View, California, is a typical device useful in this embodiment. The Fairchild device incorporates two of the respective adder sections, such as 39, in one chip. Each adder section 39 includes three inputs, identified as IN No. 1, IN No. 2, carry input ($C_{in}$) and two outputs, identified as carry output ($C_{out}$) and sum, respectively, and the adder sections operate in accordance with the following truth table:

ADDER TRUTH TABLE

| IN No. 1 | IN No. 2 | $C_{IN}$ | $C_{OUT}$ | SUM |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

It is apparent from the table that if a one appears at only one or at each of the respective inputs, then the sum is 1 or decimal $2^0 = 1$, but if any two of the inputs have ones applied thereto, then a one appears at $C_O$.

An adder-accumulator arrangement illustrative of the operation of this portion of this invention is shown in FIG. 8. The accumulator 36 includes 12 flip-flops 53, and the sum output of each adder section 39 is coupled through a lead 37 to both the inverting and noninverting input connections of a respective flip-flop 53. The noninverting output (Q) of each flip-flop 53 is coupled through a lead 38 to the second input connection ($IN_2$) of a respective adder section 39 and through a second lead, such as 44, to the magnitude comparator 50 (FIG. 1). There are 12 corresponding adders 39 and flip-flops 53 in the two units and the carry input ($C_{IN}$) of the first adder section is grounded to prevent accidental input of false information. The carry output ($C_O$) of each respective adder section 39 is coupled directly to the carry input ($C_{IN}$) of the next adjacent adder section, and the $C_O$ of the last adder section 39 is left open. In the accumulator 36, the clock input of each respective flip-flop 53 is coupled through the lead 42 to the timing and control unit 12 (FIG. 1), and the reset input of each respective flip-flop is coupled through a lead 43 to the K-index and synchronization control unit 40 (FIG. 1). As will be described in the material that follows, the pulse on lead 43 is used to reset the accumulator 36 when processing of a particular frame of data is completed. With this description, it will now be apparent that each time a strobe or clock pulse is applied to the lead 42 by the timing and output control unit 12 (FIG. 1), that the binary number appearing on leads 34 will be added to itself, such that the binary word at the output leads 44 will increase in even multiples, and therefore will represent successive harmonics of the pitch frequency, i.e., 2*f*, 3*f*, 4*f*, etc. For instance, if the pitch frequency is 74 Hz, the binary word on lead 34 is 000001001010, on application of the first strobe-pulse the number on lead 44 becomes 000010010100 or 148 ($2^2+2^4+2^7=4+16+128=148$).

In the embodiment described, it was decided that an operating frequency range of from 200 Hz to 3,820 Hz would produce the accuracy of sound reproduction desired; thus, sixteen convenient bands of frequencies within the voice frequency band selected were chosen for use and are identified as lying between the bandwidth markers set forth below:

| | | | |
|---|---|---|---|
| BW | Marker | 0 | 200 Hz |
| " | " | 1 | 332 " |
| " | " | 2 | 464 " |
| " | " | 3 | 596 " |
| " | " | 4 | 728 " |
| " | " | 5 | 860 " |
| " | " | 6 | 992 " |
| " | " | 7 | 1,135 " |
| " | " | 8 | 1,300 " |
| " | " | 9 | 1,485 " |
| " | " | 10 | 1,700 " |
| " | " | 11 | 1,945 " |
| " | " | 12 | 2,225 " |
| " | " | 13 | 2,545 " |
| " | " | 14 | 2,910 " |
| " | " | 15 | 3,330 " |
| " | " | 16 | 3,820 " |
| " | " | 17 | Recycle |

The table of channel bandwidths 70 operates to produce on its output leads, such as 46, a seven-bit binary word representative of a respective one of the frequency markers set forth above. When the table 70 is properly signaled, as by a pulse from the envelope update control 60 over a lead 45, the output switches to a seven-bit word representative of the next higher marker frequency until the bandwidth 17 marker is reached, at which time the table recycles, and starts over. As will be shown in the material that follows, the table 70 steps through each of the seventeen markers one time during 1/256 of a cycle of the pitch frequency appearing at the output of the frequency storage unit 29.

Only the seven most significant bits (MSB's) of the output of the accumulator 36 are coupled to the magnitude comparator 50 by seven parallel leads, such as 44, and the output of the table of channel bandwidths 70 is coupled to the comparator by seven leads, such as 46. The comparator 50 operates to compare the words coupled thereto from the table 70 and the accumulator 36, and if the value of the binary word presented by the accumulator is equal to or greater than the value of the binary word presented by the table 70, then the output of the comparator, at lead 47, changes state; for instance, the output may change from zero volts to a substantially constant DC voltage of a few tenths of a volt. Comparators suitable for use in this circuit are available from several sources, and in particular, a pair of National Semiconductor Corporation four-bit comparators, model DM7200/DM8200, coupled in parallel, are suitable for use in this embodiment.

Figure 9:
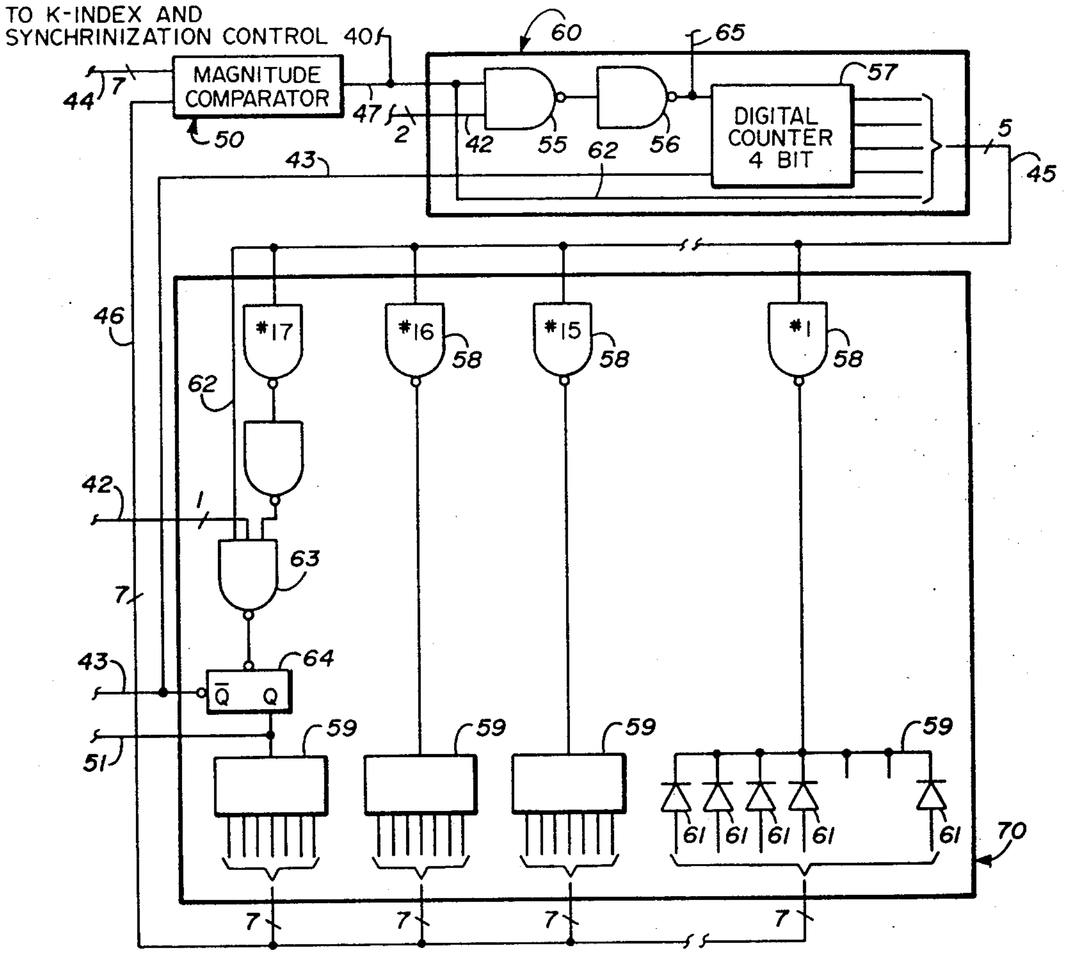
FIG. 9 is a simplified schematic drawing of the magnitude comparator, the envelope update control, and the table of channel bandwidths of FIG. 1.

Referring now to FIG. 9, the comparator 50, the envelope update control 60 and the table of channel bandwidths 70 cooperate to produce the result set forth above. As previously stated, the smallest frequency represented by the output of the table 70 is 200 Hz, thus there is always a word on line 46 equal to or greater than 200 Hz. From the timing considerations set forth in the following material, it will be apparent that new data is presented on line 44 only when the output of table 70 equals or exceeds 200 Hz. If at a particular instant, the value of a number represented on line 44 is smaller than 200 Hz, the output of comparator 50 does not change; however, as successive strobe-pulses are applied to the adder-accumulator combination 35, 36, over lines 42, as previously described, the accumulator output builds up until it eventually represents a frequency which equals or exceeds the 200 Hz magnitude, and at this time, the output of the comparator 50 changes state, typically from zero to some positive DC value. The output of the comparator 50 is coupled by a lead 47 to the envelope update 60 and specifically to a NAND-gate 55 located therein. The NAND-gate 55 has three input-connections and operates in response to the presence of three positive signals, one on each respective input, to produce a negative swing or low at its output. The clock pulses from lead 42 are coupled to the input of gate 55 and are normally high, but periodically swing low for the purpose set forth below. A negative swing at the output of gate 55 is inverted by an inverter 56 and coupled to the input of a digital counter 57 which responds to the application of a positive-going signal at its input to increase the number represented by its output by one. The output of the digital counter 57 is a four-bit word which has 16 specific combinations of binary digits (0000 through 1111), representing the numbers from 1–16; thus, the counter output provides an address for the first 16 successive marker frequencies set forth above. When the marker frequency is 200 Hz, the output of the counter is 0000, and when the word on line 44 represents a value equal to or larger than 200 Hz, then the comparator 50 output changes state and the output of the digital counter 57 changes to 0001. This address (0001) is coupled by lines 45 to the table of channel bandwidths 70 and is coupled therein to each of seventeen detect-only gates 58. A digital counter of the type described herein is a model S8281J four-bit binary counter/storage element manufactured by Signetics Corporation, Sunnyvale, California. Each detect-only gate 58, except the seventeenth, recognizes only one of the 16 possible combinations of the output of the counter 57. The read-only or detect-only memories 58 are of a type which are well-known and a typical integrated circuit chip for use as the read-only gate of this invention is a model MM-422 manufactured by National Semiconductor Company of Santa Clara, California. The output of each read-only memory 58 is coupled to a respective bank 59 of parallel-connected diodes 61. Upon the application of the proper binary word to the input of the respective detect-only gate 58 the output of the gate changes states, typically from positive to zero. Certain diodes 61 are omitted from the bank 59 associated with each gate, and the omission gives the indication of a zero at the output of the bank; thus, a particular seven-bit word is created in association with each respective detect-only gate 58. The output of each respective diode bank 59 is connected in parallel with the respective outputs of other diode banks, and all the bank outputs are coupled through leads 46 to the input of the comparator 50. When the output of the digital counter 57 is increased in value, by one step, the next succeeding detect-only gate 58 is addressed and activated, and the corresponding diode bank 59 produces a binary word representing the next marker frequency. Again, the output of the accumulator 36 (FIG. 1) increases, and the harmonic value thus produced is compared to the new frequency marker until a comparison is again achieved, in which case the entire process is repeated such that the next marker frequency is brought up for comparison.

A pair of timing signals from the timing and output control 12 are applied to respective inputs of the NAND-gate 55, and, as previously stated, the gate responds to high voltages (ones) on each of the gate leads, in this case 3, to cause the envelope update 60 to operate. Specifically, the timing signals are arranged to force the gate 55 to operate when a harmonic of the pitch frequency does not fall within the specific band. For instance, consider the pitch frequency of 180 Hz and its second harmonic of 360 Hz. Examining the list of marker frequencies set forth above, it is clear that a harmonic of the pitch frequency does not fall within the band defined by markers 200 Hz and 332 Hz. When the processing of this pitch frequency begins, the signal from the table 70 represents 200 Hz and the signal from the accumulator represents 180 Hz, thus a compare signal is not generated on line 47. As the accumulator 36 is strobed again, over line 42, the signal at the output of the accumulator goes high, i.e., changes state from zero to a positive voltage, thus indicating that a comparison has been made. After a short delay which allows the circuitry to stabilize, the envelope update 60 operates to cause the table 70 to produce a new output signal, which in our example is now 332 Hz, but notice that the signal from the accumulator 36 is still larger than the signal from the table. This being the case, the counter 57 of the envelope update 60 cannot be made to step, since the input to the comparator 50 does not call for a change at its output on line 47. As a result, the process of cycling bandwidths by units 50, 60 and 70 is halted, and the computation is disrupted. The timing pulses applied to NAND-gate 55 are arranged to cure the problem relating to the lack of harmonics falling in a band, between markers. In the embodiment illustrated, the three inputs to the NAND-gate 55 must be high, each representing ones, to cause the output of the gate to switch low, thereby enabling the circuitry to cause the counter 57 to switch. Thus, timing pulses are arranged on at least one of the lines 42 coupled to the input of the gate 55 such that at least once every cycle of the comparator 50, the voltage on the at least one lead drops to zero for a short period, and if the compare signal has not been generated by a normal compare, i.e., the presence of a harmonic in the band, then as the voltage on the at least one lead returns to a high, a false compare is generated, and the counter 57 steps, thus calling up a new bandwidth marker, for example marker 3, which is 442 Hz, and the compare circuitry is then enable to operate in its normal manner.

When the pitch frequency is very high, i.e., approaching 310 Hz, it is possible to have two bands which have no harmonics lying therein. For this reason, a double pulse arrangement is established on the least one lead of lines 42 coupled to the NAND-gate 55, and the pulses come in rapid succession to provide successive false compare signals, if necessary. Similarly, the pulses on the input of gate 55 are arranged to allow time for the comparator 50 to respond, if a normal compare is experienced.

Since the digital counter 57 has only a four-bit output with 16 possible word combinations, the address of the seventeenth marker must be created in some other manner. This input is provided by producing a high-voltage, representing a one, from the input line 47. All the outputs from the digital counter 57 are now ones (1111), and they are applied to the bandwidth 17 gate which produces a zero out. The output of the bandwidth 17 gate is then inverted and applied to a NAND-gate 63, which is similar to gate 55, such that as the sixteenth marker frequency is reached, a one is applied to one of the three inputs to the NAND-gate 63. When a compare signal again appears on line 47, indicating that the harmonic signal on lead 44 equals or exceeds 3330 Hz, a signal representing a one is applied to the second input to NAND-gate 63. The third signal representing a one is applied to the NAND-gate 63 by a clock pulse from the timing and output control unit 12 and is timed to assure that the bandwidth 16 address and bandwidth 16 compare process is complete. When the third signal is applied to the NAND-gate 63, the gate switches to a zero output which in turn sets a flip-flop 64 to produce an output one to the respective diode bank 59, which produces the proper bandwidth 17 comparison signal out of the bank, in the manner previously described. As will be described in the following material, a pulse is applied to the reset terminal of flip-flop 64 by the K-index and synchronization control 40, thus causing the table 70 to recycle.

The table of channel bandwidths 70 cycles through each of the sixteen bands for each 1/256th part of one cycle of the basic pitch frequency. In other words, data relating to the pitch frequency and each of its harmonics is generated during each 1/256th part of a cycle of the pitch frequency, thus the digital operation relates to the scheme of compilation set forth above with respect to the general Equation (1) and its expansion in equations (2), (3) and (4). The output signal on lead 65 of the envelope update control 60 is coupled to the $A_{(H,J)}$ register 66 and to the envelope update register 30, and by properly signaling these units, harmonic amplitude information in the register 30 is related to at least one sine function of the Equations (2), (3) and (4).

As is shown in FIG. 1, the output of the comparator 50 is coupled through a lead 47 to the K-index and synchronization control unit 40. The K-index and synchronization control unit 40 operates to produce a bandwidth 17 marker, which indicates the end of the cycle of the 16 bands for 1/256 of a cycle of the pitch frequency and provides a means for synchronizing the operation of the K-counter 80, the K-H accumulator 75, the reset signals on line 43, the output accumulator 85, and the digital-to-analog (D/A) converter 86.

Figure 10:
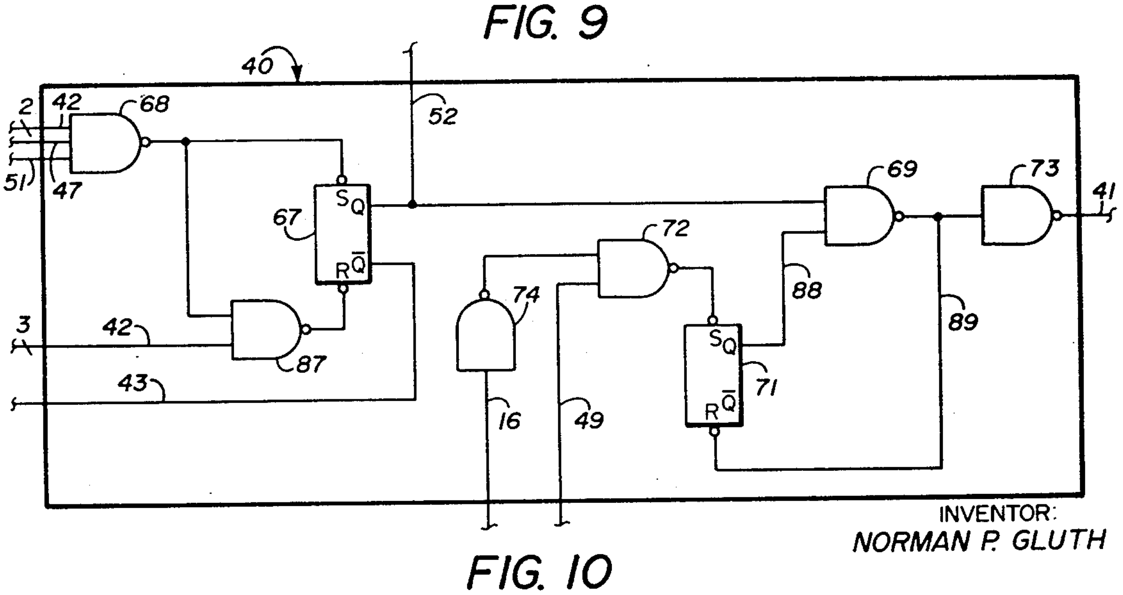
FIG. 10 is a simplified schematic of the K-index and synchronization control of FIG. 1.
Figure 12:
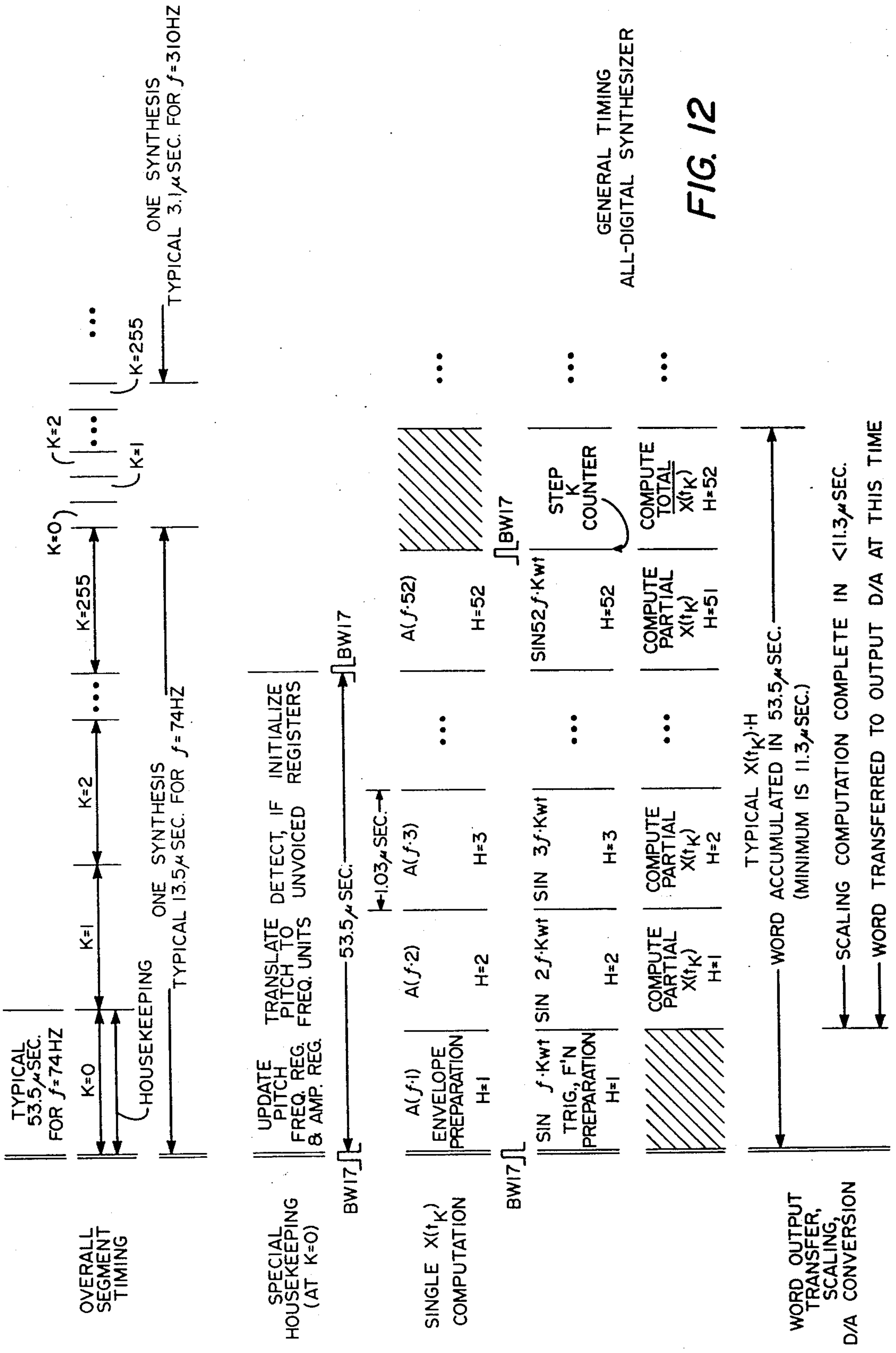
FIG. 12 and 12a are a diagrammatic illustration of the general timing of various components of the synthesizer of FIG. 1.
Figure 12A:
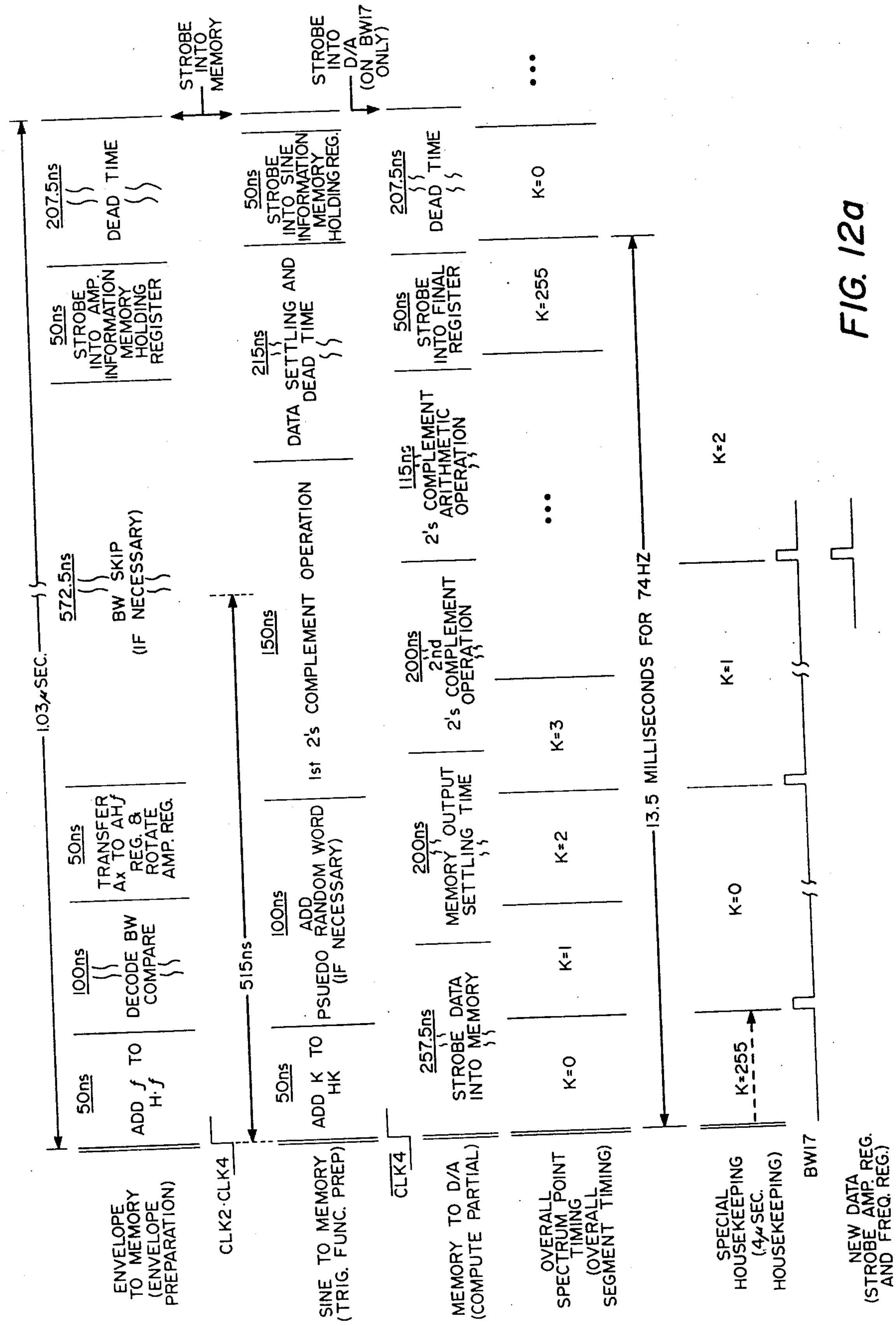

Referring to FIG. 10, the K-index and synchronization control 40 includes a first NAND-gate 68 which has four input connections. Two of the input connections are coupled to leads 42 from the timing and output control unit 12 while the third lead is coupled to the output of the comparator 50 through a lead 47, and the fourth lead is coupled to the table of channel bandwidths 70 at the noninverting output of flip-flop 64 (FIG. 9), i.e., the bandwidth 17 address output. The gate 68 operates in response to high-voltages (ones) on each of its respective inputs to produce a low output (zero). When the bandwidth 17 address is generated in the table of channel bandwidths and the flip-flop 64 (FIG. 9) is set, a high-voltage is generated on line 51 and remains there at least during the processing of the seventeenth band for the particular cycle in question; therefore, a high appears on one lead of the input of gate 68 during that time. Additonally, high voltages are applied on clock leads 42 coupled to the input of gate 68 at a time corresponding to the completion of the cycle through bandwidth markers 1–17, thus providing only a limited span of time during which the bandwidth 17 marker can be generated. The timing described serves to disable the bandwidth 17 marker, except for a preselected time window, to prevent the accidental actuation of the bandwidth 17 marker in response to spurious signals which may appear on the line, thereby improving the reliability of the computations during each cycle. Finally, the output of the comparator 50 (FIG. 9) is coupled through a lead 47 to the fourth input of the gate 68 (FIG. 10). After the bandwidth 17 address is generated and a compare signal is generated in response thereto, the output of comparator 50 goes positive, as previously described, and the fourth high is applied to the gate 68 to cause the output thereof to switch to zero. The output of gate 68 is coupled to flip-flop 67 and sets the flip-flop when the output falls to zero, since the flip-flop 67 has an inverter coupled to its set input. In its set state, the flip-flop 67 has a high on its noninverted output (Q) and a low (zero) on its inverted output ($\bar{Q}$). The noninverted output is coupled to line 52 and to the input of gate 69 and provides the bandwidth 17 marker signal. The inverted output (Q) provides the bandwidth 17 "not" signal, which is referred to hereinafter, and is coupled to line 43. The bandwidth 17 "not" signal is used to reset various equipment in the synthesizer.

A reset-disable circuit including NAND-gate 87 is coupled between the output of gate 68 and the reset input of flip-flop 67. The gate 87 has four inputs, and a first of the inputs is coupled to the output of gate 68. The remaining three inputs to gate 68 are coupled by line 42 to the timing and output control 12. Thus, while the output of gate 68 is low, at least one of the inputs on gate 87 is low, and the flip-flop 67 cannot be accidentally reset at the wrong time, i.e., when the bandwidth 17 marker is turned "on". When the output of 68 is high, as when one of the clock pulses on line 42 is removed, and the flip-flop 67 is set to produce the bandwidth 17 marker, as previously described, the flip-flop 67 remains set until clock pulses on lines 42 provide the necessary highs on the remaining three lines to cause the output of gate 87 to go low. The low at the output of gate 87 is inverted at the reset input of flip-flop 67, and thus, the bandwidth 17 marker is removed. The timing on lines 42 at the input to gates 68 and 87 are arranged to set the pulsewidth of a respective bandwidth 17 marker.

The noninverted output of flip-flop 67 is coupled to NAND-gate 69, as previously stated, and the output of gate 69 is coupled through an inverter 73 to lead 41. Gate 69 has a second input connection which is coupled to the noninverted output of a flip-flop 71, and the output of gate 69 is coupled to the reset input of flip-flop 71. The frame synchronization signal is coupled from the input means (FIG. 1) through lead 16 and through an inverter 74 to a first input connection of NAND-gate 72, and a pitch synchronization signal from the K-counter (FIG. 1) is coupled through lead 49 to a second input of gate 72. The frame synchronization signal is normally low but is inverted by inverter 74, thus, a positive signal is applied to one input of gate 72 at all times, except when the frame sync signal is present on line 16. The pitch sync signal on line 49 is generated in the K-counter 80 and corresponds to the start of a full-cycle of the pitch frequency ($K = 0$). When the frame sync signal and the pitch sync signal are both present simultaneously, since the frame sync is inverted, the gate 72 is disabled. When a pulse is produced by the K-counter 80 on line 49 at any time, except when there is a frame sync present on line 16, two positive pulses are produced on the input of NAND-gate 72, and a low appears at the output. This low is coupled to the set gate of flip-flop 71 and is there inverted to cause the flip-flop to set. When the flip-flop 71 is set in this manner, a high is produced on lead 88 which is coupled to the input of a NAND-gate 69. When the gate 69 has highs on each of its two inputs, as when there is a bandwidth 17 marker, and when the K-counter 80 (FIG. 1) steps to any position other than $K = 0$, the output described, the frame sync pulse (on line 16) causes the amplitude information data to shift from the amplitude buffer-register 22 to the envelope register 30. If a change of frame information is called for, as by a pulse on line 41, at the precise moment that the amplitude information is being transferred from the register 22 to the envelope register 30 and before the transfer lines 25 have settled, erroneous data may be recorded in the envelope register, thereby disrupting the operation of further computations by introducing error. Thus, the gate 72 is disabled, as described, to prevent these errors.

The bandwidth 17 marker, on line 52, is coupled to the K-counter 80, the output digital-to-analog converter 86, the scaling multiplier 84, and the accumulator 85. When the output of gate 69 goes low, it is inverted by an inverter 73 to which it is coupled and a positive or high is produced on lead 41 out of the inverter. Additionally, when the output of 69 goes low, the low is coupled through a lead 89 to the reset connection of flip-flop 71 where the signal is inverted to reset the flip-flop, thus removing a high from the input of gate 69. It is now apparent that the pulse produced on line 41 has a duration which corresponds to the response time of the reset circuit of flip-flop 71.

The disable circuitry associated with flip-flop 71 prevents the occurrence of a $K = 0$ pulse from the K-counter 80 at the same time that a frame synchronization pulse occurs. As previously stated, a pulse on line 41 is coupled to the envelope register 30 to cause the register 30 to load from the register 22. Line 41 is coupled also to the frequency storage unit 29, and the synchronization pulse thereon causes data to transfer from the frequency storage unit 29 to the adder 35. Note that these operations occur only when $K = 0$, since, as previously described, a $K = 0$ pulse is required from the K-counter 80 to enable the generation, in the control unit 40, of the pulse on line 41.

The envelope register 30, FIG. 1, accepts and stores the amplitude data from the amplitude buffer-register 22 upon the receipt of a pulse over line 41 from the K-index and synchronization control unit 40 and is properly a part of the input means 15. Since the pulse on line 41 corresponds to the bandwidth 17 marker, it represents the end of a cycle through the 16 segments of the voice band for the 1/256th increment of one cycle of the pitch frequency that is present, thus a new frame of amplitude data is called up and stored in the envelope register 30 for use with the next full-cycle of the pitch frequency.

Once the amplitude data from a particular frame is stored in the register 30 in response to a pulse on line 41, and a compare signal is generated for each of the 16 bands, the proper amplitude data in register 30 much be synchronized with the respective band to which it relates. Therefore, each time a new bandwidth marker address is called up in the table of channel bandwidths 70, a pulse is extracted from the input of the counter 57 in the envelope update control 60 (FIG. 9)on lead 65, and this pulse strobes the envelope register 30 to cause the amplitude data at the output of the register to change to the next word of amplitude data within the frame in order of time. The circuitry in the envelope register 30 is similar to that of register 22 in that it includes a group of flip-flops which are pulsed by the signal on line 41 to cause them to set in accordance with the data on their respective inputs. The output of the envelope register 30 is coupled back to its input to provide a path for recirculation of the amplitude words of each frame.

The update signal on line 65 from the envelope update control 60 is coupled to the $A_{(H,f)}$ register 66, also, and when an envelope update pulse is generated on line 65, the amplitude data on leads 76 at the output of the envelope register 30 is transferred and stored in the $A_{(H,f)}$ register 66 and is also circulated through the recirculation path, previously described, and stored again in the envelope register 30, to become the last word in order of time instead of the first. In this manner, the envelope register 30 shifts through each successive word of amplitude data in response to a shift signal from the envelope update 60.

The $A_{(H,f)}$ register 66 stores the 3-bit words of data on line 76 in response to a pulse on line 65. Clock pulses on line 42 are applied to the register 66 to provide a time-window when storage can occur, thus preventing the erroneous storage of data in response to transients. Similar techniques and circuitry for providing the time-window have already been described. The output of the $A_{(H,f)}$ register 66 is coupled over leads 81 to the table of amplitude modulated trig functions 90.

The K-counter 80 is a counter similar to the counter 57 (FIG. 9) previously described, and is a commercially available unit. The basic difference between the counter 80 and the converter 57 is the counting range or magnitude of the output word which is produced. The K-counter 80 has an 8-bit output and can therefore count to a higher level than the counter 57 which has only a four-bit output. Each bandwidth 17 marker pulse on line 52 strobes the K-counter 80 causing it to step. The K-counter 80 is designed to step successively from $K = 0$ through $K = 255$ in response to the successive pulses on line 52. When the K-counter 80 reaches the $K = 0$ step, it generates a pulse on line 49 that signals the start of a new cycle of the pitch frequency. The binary output of K-counter 80 is arranged such that it is all zeros (lows) when $K = 0$. Eight parallel-connected logic-gates are coupled respectively to respective ones of the output bit-positions of the K-counter 80, and each gate operates to invert the signal applied to its input, whether it is high or low. As will be recognized by one skilled in the art, the gates can be arranged such that when the output of each gate is a high, and only in this case, a high output is produced. This case occurs only when the K-counter recycles in response to a bandwidth 17 marker, such that its output is all zeros. This high output is applied to lead 49 to signal $K = 0$ to the respective units previously described.

The adder 77 and K-H accumulator 75 are similar in construction and operation to the adder-accumulator combination 35, 36. The output of the K-counter 80 is coupled to the input of adder 77, and the adder 77 is coupled to the accumulator 75 in substantially the same manner that adder 35 is coupled to accumulator 36. Each time the K–H accumulator 75 is clocked by a pulse from the timing and output control 12, the binary number at the input to the adder 77 adds to itself. Each time a bandwidth 17 marker is generated on line 52, the K-counter steps, placing a new binary number representing a number from $K = 0$ to $K = 255$ at the input to the adder, and the bandwidth 17 "not" signal on line 43 resets the K–H accumulator 75 at the appropriate time, such that the computation begins again. The output of the K–H accumulator 75 is coupled over eight parallel lines, through adder 78, to the input of the table of amplitude modulated trig functions 90. The adder 78, as will be described hereinafter, operates to add in the unvoiced data to improve the intelligibility of the voice signal produced.

At the particular moment when $K = 0$, the binary output of the K-counter 80 is all zeros, and the adder-accumulator 77–75 correspondingly also produces an all zero output. Since this is the case, the time span between $K = 0$ and $K = 1$ is used to accomplish data transfer into the envelope register 30 and into the frequency storage unit 29, and time is provided to allow the circuit transients to settle-out before the computation for the next cycle begins.

Figure 3:
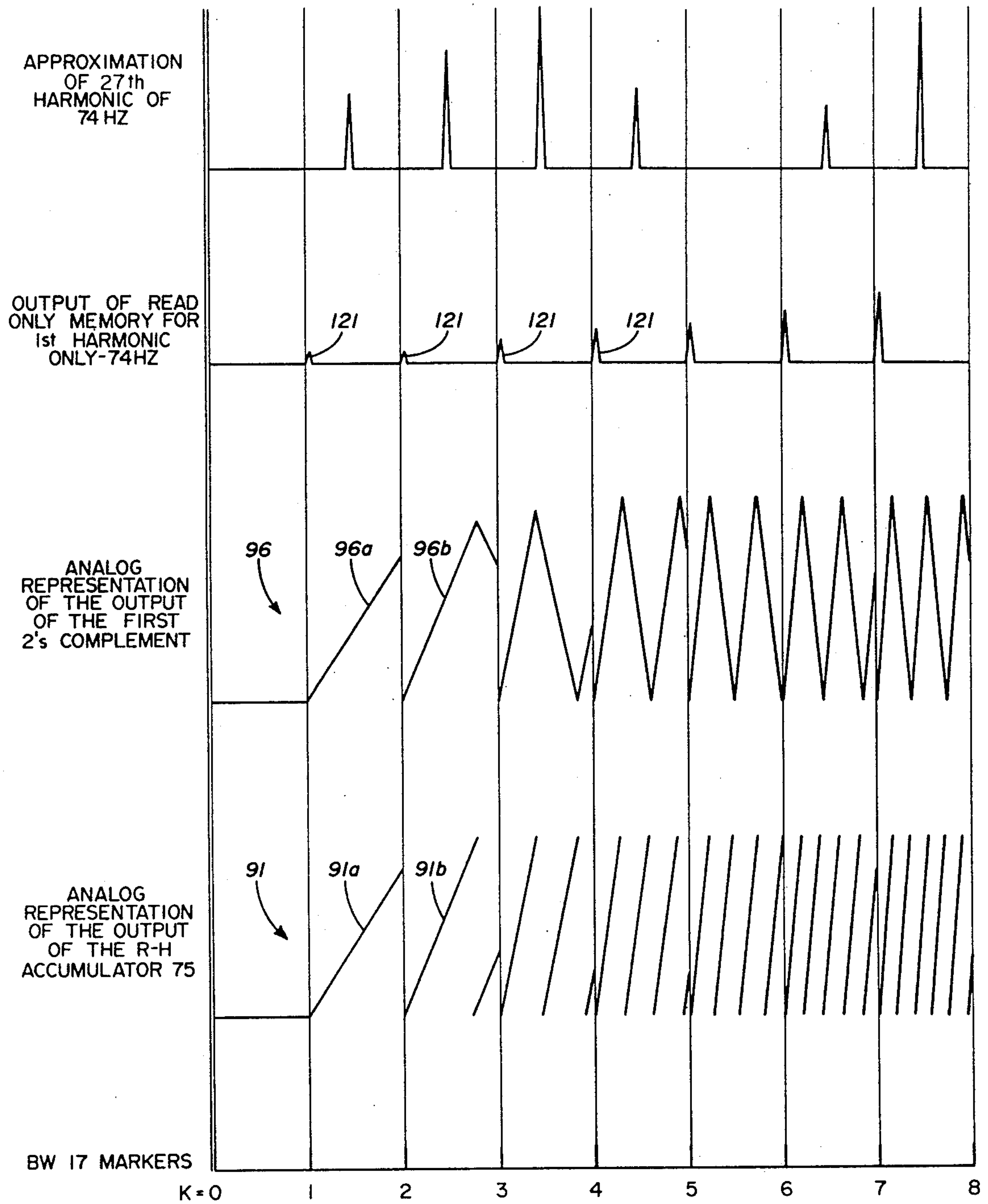
FIG. 3 is a graph illustrating the computation of the frequency components of the synthesized signal.

Referring now to FIG. 3, as the K-counter 80 is pulsed and its output switches to a binary word equal to 1, the adder-accumulator 77–75 begins to operate and the output of the accumulator 75 begins to increase at a gradual rate. Further, as the K-counter 80 (FIG. 1) is pulsed by a bandwidth 17 marker pulse on line 52 at any one of the $K=2$ to $K=255$ steps, the output of the adder-accumulator 77–75 begins to produce increasingly larger digital words. Since the timing pulse applied on lead 42, coupled to the K–H accumulator 75, occurs at a constant rate, the output of the K–H accumulator increases at a constant rate. Assuming that the binary output of the K–H accumulator 75 were applied to an analog-to-digital converter and plotted, the plotted curve would look like curve 91 of FIG. 3. As has been described, the output of the accumulator 75 does not increase, but remains at zero during the time interval from $K=0$ to $K=1$.

It is apparent from the curve 91 that the output of the K–H accumulator 75 begins to increase from zero with each bandwidth 17 marker strobe. This is true because the accumulator 75 is reset by the bandwidth 17 "not" pulse which is coupled to the K–H accumulator by lead 43. The slope of the curve 91 during any one bandwidth 17 period is determined by the value of the word at the output of the K-counter 80 (FIG. 1). Thus, when the output of the K-counter 80 is a binary word equal to one, as at the time $K = 1$, then the curve has a certain slope, as in curve 91*a*. When the output of the K-counter 80 increases in response to being strobed by the next bandwidth 17 marker, the word at the output of the K-counter increases and the slope during this bandwidth 17 period is steeper than that during the first period, for instance see curve 91*b*. When the K-counter 80 output word is equal to 2, then the slope increases twice as fast, where the output word is equal to 3, as at $K = 3$, the slope is three times as steep and so on for successive ones of the 255 counts before the counter recycles. Since the output of the accumulator 75 includes only eight bits, the accumulator output increases in steps and the maximum number of successively increasing words which can be produced at the output is 54 (at 74 Hz), thus the accumulator output builds up for 54 steps, unless cutoff by the next bandwidth 17 marker. When the output of the accumulator 75 reaches the maximum number of steps, it recycles to zero and begins to build up again, as in curve 91*b*, 91*c*, etc., of FIG. 3.

It is now apparent, in view of the disclosure relating to FIG. 1, that the bandwidth 17 markers occur at a repetition rate which is proportional to the rate at which comparisons are made at the magnitude comparator 50 of FIG. 1. Thus, the higher the pitch frequency associated with a frame of data being processed, the shorter will be the time the output of accumulator 75 will build up. Additionally, when the pitch frequency is 74 Hz, the accumulator output builds up for 54 steps, but at a pitch frequency of 310 Hz, the output will build up for only 11 steps, and for pitch frequencies lying between 74 and 310 Hz, the output of accumulator 75 will build up a number of discrete steps between 54 and 11. The number of steps in the marker band is in an inverse proportion to the value of the word at the output of the K-counter. Therefore, as the K-counter 80 is strobed by successive bandwidth 17 marker pulses, the output of the accumulator 75 builds up for successive periods in a manner similar to the analog representation of the output provided in curve 91 of FIG. 3. The output of the K–H accumulator 75 is produced, in the manner described, simply as a mechanical means for producing sine information from the table of amplitude modulated trig functions 90.

$[A_{H,f} \text{Sin } 2\pi (H,f)]$

Figure 11:
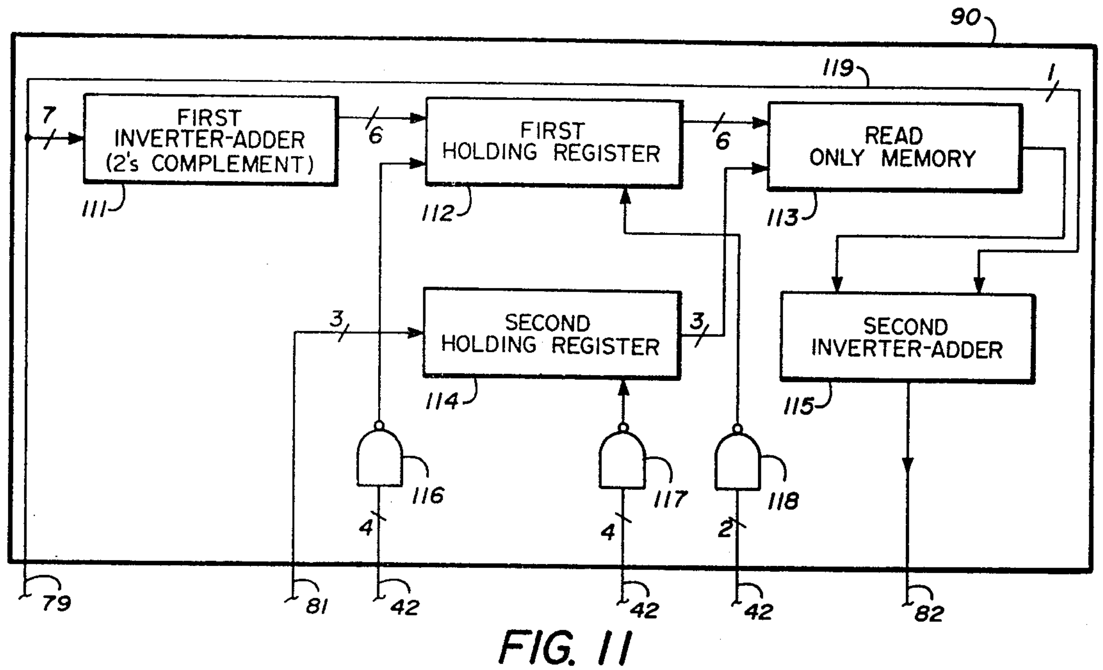
FIG. 11 is a simplified schematic of the table of amplitude modulated trig functions of FIG. 1.

Considering now FIG. 11, the output of the K–H accumulator 75 is fed through the eight-bit adder 78 and lead 79 to the table of amplitude modulated trig functions 90. The output of the accumulator 75 is in digital format, in eight-bit words. Interiorally of the table of amplitude modulated trig functions 90, the data on line 79 is fed, with the exception of the most significant bit, to a first inverter-adder 111. Considering the eight-bit word on line 79, the two most significant bits of the word represent quadrant information, i.e., 00 for the first quadrant, 01 for the second quadrant, 10 for the third quadrant, and 11 for the fourth quadrant. The most significant bit is fed through line 119 to the second inverter-adder 115, and its use will be discussed in association with respect to the second inverter-adder operation. The second most significant bit is fed directly to the first inverter-adder 111 along with the remaining six-bits of data on line 79. The most significant bit of the seven-bit word fed to the inverter-adder 111 provides an indication to the inverter-adder as to when inversion is required. For instance, when the most significant bit is 0, i.e., in the first quadrant, then the information goes through the inverter-adder 111 without inversion, and when the most significant bit of the seven-bit word is a 1, then the inverter-adder inverts the information and adds one before passing the information on to the first holding register 112. The inversion and addition is accomplished in unit 112 by circuitry incorporating a well-known technique commonly known as the 2's complement. The 2's complement is fully explained at page 367 of the text *Digital Computer* by Yauhan Chu, published by McGraw-Hill Publishing Company of New York. The most significant bit of the seven-bit word applied to the input of the inverter-adder 111 is dropped from the data stream in the inverter-adder, and the six remaining bits of information are passed to the first holding register 112.

Curve 96 of FIG. 3 provides an analog representation of the digital output of the inverter-adder 111. As the seventh, or second most significant bit of the eight-bit word on line 79 changes to a 1, the next data input to inverter-adder 111 is inverted and a one is added, and the curve 96, between respective bandwidth 17 markers, becomes a triangularly-shaped, oscillating wave (if plotted as an analog), and the number of steps in each rising or falling segment of the oscillating wave depends on the value of the word at the output of the K-counter 80 of FIG. 1.

The clock pulses on line 42 are coupled to gate 116 which is in turn coupled to the first holding register 112. The register 112 is similar in construction and operation to other registers described herein, for instance, the pitch-frequency buffer-register 26, and therefore includes a series of parallel connected flip-flops. The output of gate 116 is coupled to the clock input connection of each respective flip-flop in the register 112. When a respective flip-flop is strobed with a clock pulse, the six-bit digital word appearing on the inputs of the parallel connected flip-flops is set on the noninverted output of the flip-flop.

The output of the first holding register 112 is coupled to the read-only memory 113, which includes a total of 512 separate recognition gates, which for the embodiment described, are manufactured in two integrated circuit chips, with each respective chip including 256 of the gates. Each gate has at least nine inputs. The six lines out of the holding register 112 are coupled in parallel to six of the inputs of each of the recognition gates. The amplitude data in the $A_{(H,f)}$ register (FIG. 1) is coupled over lead 81 (three-bits) through the second holding register 114 to the read-only memory 113 and specifically is parallel to the remaining 3 input leads of each of the recognition gates. Each recognition gate has a plurality of parallel output lines, and upon the application by a particular combination of amplitude data and preliminary sine data, the recognition gate produces an output digital word on the output parallel lines which is equal to the computation of a specific point on the voice curve to be produced, in accordance with the Equation (1) set forth at page 11 herein. The output of the respective recognition gate is therefore equal to the sine of an angle lying (at this point in time) between 0° and 90°, times the amplitude information relating to one of the sixteen bands of voice frequencies previously described.

Each 1.03 microseconds, the preliminary sine information changes at the output of the first holding register 112. If the curve 96 of FIG. 3 is taken to represent a pitch frequency 74 Hz, a portion of the curve 96, for instance **96*a*, builds up in 54 steps, as previously described. The word corresponding to each step also corresponds to an even multiple of the output of the K-counter 80. Since there will be 54 steps in the curve 96a, a particular point on the curve corresponds to a particular harmonic of the pitch frequency of 74 Hz. The digital word corresponding to a step represents the sine of that harmonic, and when during a particular bandwidth 17 cycle, there is an amplitude word out of the $A_{(H,f)}$ register 66** corresponding to this harmonic, then a particular recongition gate is turned on, and the value of the output word produced equals the sine of the angle represented by the harmonic point times the amplitude data.

Each of the recognition gates described above is similar to the detect-only gates described with respect to the table of channel bandwidths 70, and each differs only in the number of input and output leads. The word produced at the output of the diode bank equals the sine of the angle related to the harmonic times the amplitude data from the amplitude register 66. The second holding register 114 is substantially the same in operation and design as the register 112, but includes only three flip-flops. The timing and output control 12 of FIG. 1 is coupled to the second holding register, through leads 42 and gate 117.

In FIG. 11, the clock pulses provided on line 42 through gate 117 to the second holding register 114 are arranged such that the gate 117 provides a pulse to the second holding register to enable it to pass the information in the register to the read-only memory 113 at a time prior to the time that the pulses on line 42 through gate 116 provide a pulse to the first holding register 112 to enable the first holding register 112 to pass the preliminary sine information to the read-only memory 113. Each of the nine parallel lines, including six lines from the first holding register 112 and the three lines from the second holding register 114, are coupled in parallel to the input of each of the respective recognition gates of the read-only memory 113. It will be apparent to those skilled in the art that the output of the $A_{(H,f)}$ register 66 of FIG. 1 will produce, since its output consists of only a three-bit word, only eight possible combinations of amplitude data which are coupled to the table of amplitude modulated trig functions 90 of FIG. 1. Similarly, the sine information out of the register 112 and into the table of amplitude modulated trig functions 90 consists of only 64 possible combinations. Each recognition gate of the read-only memory 113 recognizes a respective one of the eight possible words relating to amplitude information and only 1 of the 64 possible words relating to sine information, and in response to recognition of these two words, produces an output word which is related to a particular frequency, i.e., either the fundamental or a particular harmonic and has an amplitude which is determined by the amplitude information by the $A_{(H,f)}$ register. The output of each respective recognition gate is, therefore, the product of the sine of the angle corresponding to the harmonic (or the fundamental) at a particular instant of time, times the amplitude information relating to the harmonic or fundamental at that time. If there is no related harmonic and amplitude information, the output of the read-only memory 113 will be zero at that time, thus that harmonic is absent from the sound at that instant of time. If this data is converted at this point into analog information, the output of the read-only memory 113 for only the fundamental frequency is shown in FIG. 3, curve 121. In this curve, only the first few degrees of a sine wave of the fundamental frequency is shown. The sine wave is, of course, the envelope of the respective pulses. Curve 193 of FIG. 3 illustrates similar amplitude points plotted for the 27th harmonic of the pitch frequency. Words corresponding to the amplitude times the sine of every harmonic of each pitch frequency and for the pitch frequency itself are produced during each bandwidth 17 time period, where corresponding amplitude data is available.

Figure 4:
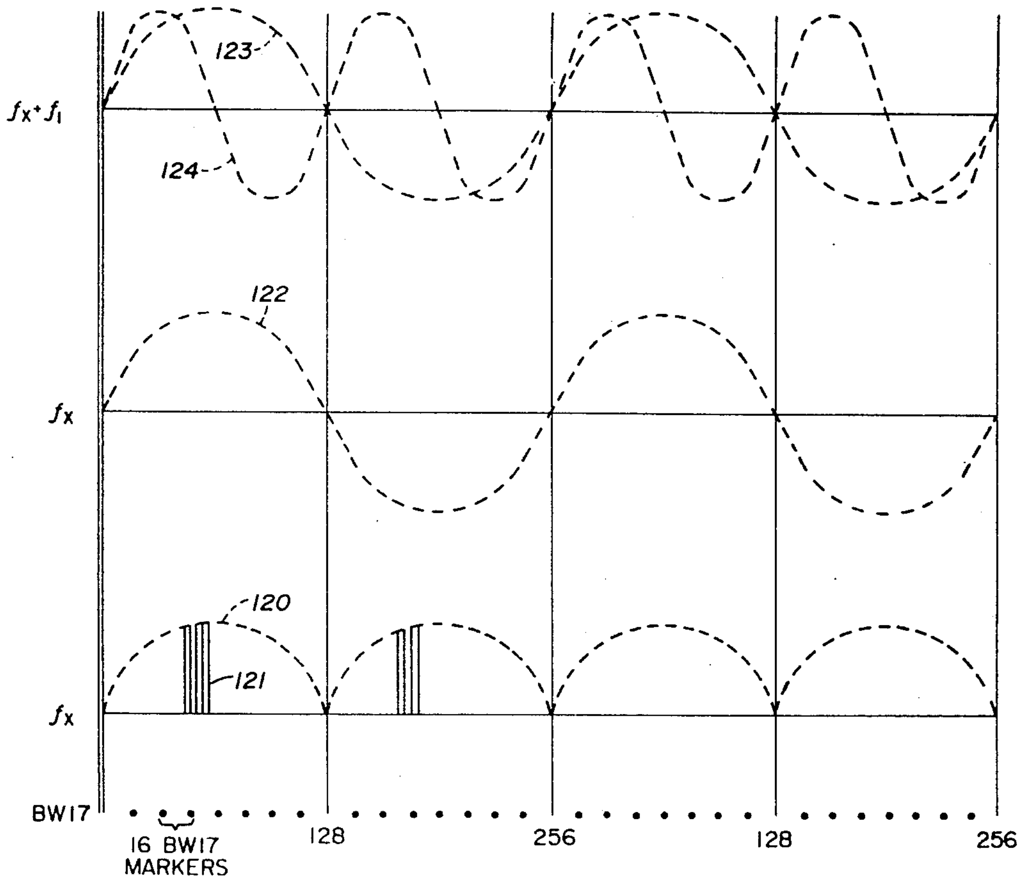
FIG. 4 is a graph illustrating a technique used to obtain sine information in the synthesized signal.

Now consider FIG. 4. At a particular frequency $F_x$ where $F_x$ is the pitch frequency, curve 120 shows the envelope response of 256 bandwidth 17 markers for two cycles of the basic frequency $F_x$. This curve (120) corresponds to the curve 93 of FIG. 3 and relates to only one frequency in the band. At the output of the read-only memory 113, the respective outputs 121 of each respective recognition gate will be only positive in direction. Therefore, the output of the read-only memory 113, in FIG. 11, is coupled to the input of a second inverter-adder 115 which is similar to the first inverter-adder 111. The most significant bit of the eight-bit word out of the eight-bit adder 78 and coupled to the input of the table of amplitude modulated trig functions 90 is coupled through lead 119 to the input of the second inverter-adder 115. As previously described, this most significant bit on lead 119 is a portion of the quadrant data made up of the two most significant bits of the data on lead 79. When the most significant bit on lead 119 is a zero, this indicates that the half cycle presently coupled to the second inverter-adder 115 from the output of the read-only memory 113 is not to be inverted. Similarly, a one appearing on lead 119 and coupled to the second inverter-adder 115 would mean that the one-half cycle presently appearing at the input of the second inverter-adder 115 is to be inverted. As with the first inverter-adder 111, the inversion is accomplished through the use of a 2's complement circuitry of the type previously described. The output of the second inverter-adder 115, on output leads 82, is a series of digital words representing points on a wave whose envelope is plotted in FIG. 4 for only one harmonic (curve 122). Curves 123 and 124 of FIG. 4 illustrate the envelope of a similarly plotted wave 123 of a basic frequency and a similarly plotted wave 124 of a harmonic thereof. At all times, except when there is a 0 on the output of the first holding register 112 of FIG. 11 or on the output of the second holding register 114 of FIG. 11, there is an output from the read-only memory 113.

$$X_{(tk)}=\frac{1}{H}\sum_{H\cdot f=1}^{L}A(H\cdot f)\left[\mathrm{Sin}\,\frac{2\pi(H\cdot f)(KT)}{C}\right]$$

The output of the table of amplitude modulated trig functions 90 is coupled over leads 82 to an adder-accumulator 83–85, which is similar in operation and construction to the adder-accumulator previously described, i.e., adder-accumulator 35–36. The accumulator 85 is clocked by a clock pulse on lead 42 each 1.03 microseconds, such that each time a new word, relating to a harmonic, is produced by the table 90, the accumulator cycles. The accumulator 85 is reset by each bandwidth 17 marker. The adder 83, however, is not reset, as was the adder 35, and the output of the adder-accumulator 83–85 continues to build up in response to every output of the table 90. The output of the accumulator 85 is a digital word (10-bits) representing the summation of the words output from the table 90 during an instant of time, i.e., the time span between the respective bandwidth 17 markers.

The output of the accumulator 85 is coupled by 10 parallel leads to the scaling multiplier 84. If a pitch frequency of 310 Hz is being processed, eleven words are added in the accumulator 85 if there is amplitude data in the $A_{(H,f)}$ register corresponding to each of the harmonics. Similarly, if a pitch frequency of 74 Hz is being processed, 54 words could be added in the accumulator for one bandwidth 17 period. Thus, it is apparent that the amplitude of the word transferred to the digital-to-analog converter 86 must be scaled to prevent an unbalance between the sound at various instants of time.

The scaling multiplier 84 accomplishes the required equalization. The scaler 84 includes a counter similar to the counter described with respect to the envelope update control unit 60. The counter is coupled to a 1.03 microsecond clock pulse from the timing and output control unit 12 over lead 42. This clock pulse effectively counts the number of harmonics included in the output of the accumulator 85, since the computation of a word relating to each harmonic in the table 90 requires just 1.03 microseconds. The output word, from the accumulator 85, is then divided by the output of the counter to equalize the band. Since both the divisor and dividend are digital words, the division can be accomplished digitally by any one of several well-known techniques.

When the equalization process is completed, the output of the scaling multiplier 84 is a digital word which represents a point on the curve which corresponds to the speech to be synthesized, thus, the output of the multiplier 84 is coupled to a standard digital-to-analog converter 86, and the converter produces an analog voltage output which has an amplitude corresponding to the magnitude of the digital word produced. The bandwidth 17 marker on line 52 is coupled respectively to the accumulator 85, the multiplier 84, and the digital-to-analog converter 86 to reset each unit upon the application of a bandwidth 17 pulse. It follows that a new point is provided to the digital-to-analog converter 86 corresponding to each bandwidth 17 pulse. The analog output of the converter 86 is a step-voltage function, however, the timing of each step is short enough that the steps in the curve are not perceptible to the ear, and when the analog output of the converter 86 is coupled to a loudspeaker or the like, speech is effectively synthesized from the digital description of the original sound.

It has previously been stated that when unvoiced sound has been analyzed, the frame of data at the input to the synthesizer 10 will include all zeros for the pitch frequency data word. The amplitude data of the unvoiced frame will accurately relate to the amplitude of the unvoiced sound in the respective bands of the original voice spectrum.

Refer to FIG. 1 again; the output of the frequency data conversion unit 28 is coupled to the input of the unvoiced detector 33. The nine parallel lines 32 out of the frequency data conversion unit 28 are coupled respectively into one of nine parallel diode-transistor-logic (DTL) gates in the unvoiced detector 33. The DTL is well-known in the electronics art and it is also known that one characteristic of parallel-connected DTL's is that when all zeros (lows) are applied to the respective inputs and the outputs are coupled together, the output signal produced is a one (high). Thus, when unvoiced sound is represented by a frame of data, the output of the nine parallel DTL's goes high, and the unvoiced sound is detected by the apparatus provided.

The output of the DTL's is coupled through a lead 126 to the noise generator 127 and through a second lead 125, an inverter (not shown), and to the frequency storage register 29. The signal on lead 125 is coupled to a respective flip-flop in register 29 which sets the flip-flop to produce an output word (from register 29) representing the pitch frequency of 128 Hz. This produces the result, in the frequency storage 29, of a voiced sound having a pitch frequency of 128 Hz. This particular frequency is chosen because it will provide at least one harmonic in each of the 16 bands of the voice-frequency spectrum. The 128 Hz frequency is used as a carrier which is modulated in a manner described in the following material to produce a balanced noise spectrum in the sound to make the sound appear more natural and to thereby improve the intelligibility and quality of the sound reproduced.

As the frequency storage unit 29 is forced to the fundamental pitch frequency of 128 Hz by the "unvoiced" indication on lead 125 from the unvoiced detector 33, the 128 Hz basic pitch frequency establishes through the remainder of the circuitry, and particularly from the K-index and synchronization control unit 40, a bandwidth 17 marker that occurs at a particular repetition rate. This bandwidth 17 marker is then coupled to the noise generator 127 by lead 52, and is coupled to the K-counter 80, as previously described. With this particular bandwidth 17 repetition rate applied to the K-counter 80, the K-counter begins to step, thereby causing the adder-accumulator 77, 75 to produce an output which increases through some 29 steps (corresponding to the number of harmonics of 128 Hz).

Figure 13:
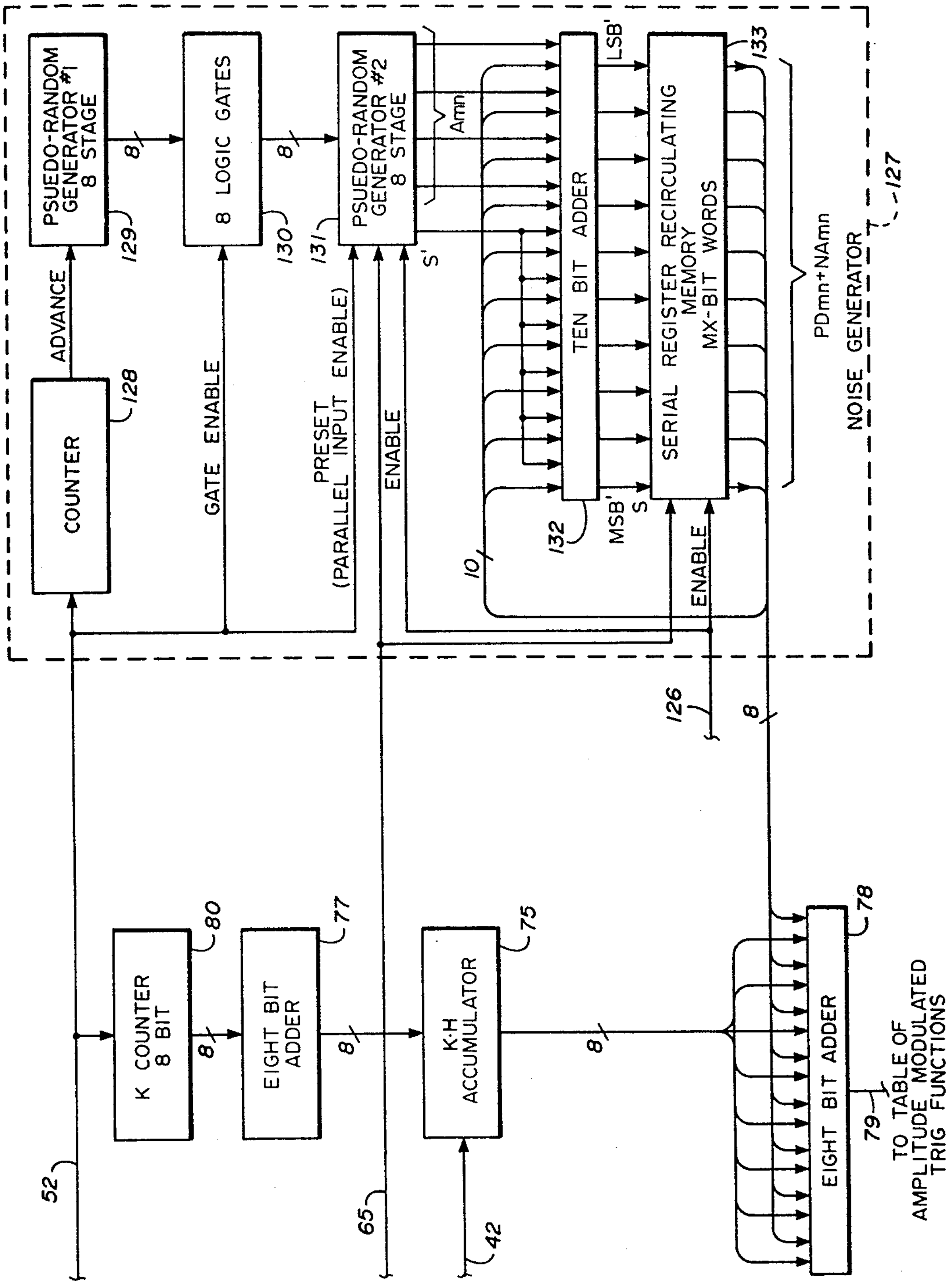
FIG. 13 is a simplified schematic of the noise generator of FIG. 1.

Refer now to FIG. 13. Inside the noise generator 127, the bandwidth 17 marker on lead 52 is coupled to a counter 128, which, in the embodiment described, functions to produce an output pulse in response to each 25th bandwidth 17 marker. The output of the counter 128 is coupled to a pseudo-random generator 129. The pseudo-random generator is a device well-known to those skilled in the art and is described fully in a text entitled *Digital Communications with Space Applications* by Golomb, Baumert, Easterling, Stiffer and Viterbi Published by Prentiss-Hall Company, Englewood Cliffs, New Jersey. The output of the pseudo-random generator 129 is an eight-bit word which varies in response to a pulse from the counter 128 in a random manner over a fixed period of time. For instance, the output of the pseudo-random generator may vary at random for 1000 strobes of the output of counter 128, and then the cycle will repeat in the same random manner for the next 1000 cycles, etc. The repetition of the pseudo-random generator 129 occurs at approximately 25,000 counts of the K-counter, and therefore, is completely random for the purposes of this noise generator.

The output of the pseudo-random generator 129 is coupled to the input of the second pseudo-random generator 131 through logic gates 130. Each of the parallel bits of the output of the pseudo-random generator 129 is coupled through a respective logic gate 130, to the leads coupled to the pseudo-random generator 131. The bandwidth 17 marker signal on lead 52 is coupled directly to each of the respective logic gates 130. Each bandwidth 17 marker on lead 52 causes the respective logic gate to set, thereby placing the eight-bit word at the output of pseudo-random generator 129 at the input of pseudo-random generator 131. It is apparent now that the output of the pseudo-random generator 129 changes at a time corresponding to *each* 25th bandwidth 17 marker, and the eight-bit word at the output of the generator 129 is transferred through the logic gates 130 upon the occurrence of *each* bandwidth 17 marker. The pseudo-random generator 131 is identical in construction to the pseudo-random generator 129, but each of the generators 129, 131 includes parallel input flip-flops, and the clock input of the input flip-flops of generator 131 are coupled to the bandwidth 17 marker lead 52, thus a bandwidth 17 marker pulse on lead 52 serves to preset the data output from the pseudo-random generator 129 at the input of the pseudo-random generator 131. Also, timing pulses from the envelope update control 60 (FIG. 1) are coupled to the pseudo-random generator 131 (on lead 65), and a pulse is applied to the pseudo-random generator from the envelope update each 1.03 microseconds. The envelope update control signal, as was previously described, occurs each time a comparison is made at the magnitude comparator 50. Thus, the pseudo-random generator 131 advances 16 times during the time span between bandwidth 17 markers. This means that during the bandwidth 17 marker period, only 16 of the random words produced by pseudo-random generator 131 will appear at its output. The envelope update signal on lead 65 is also coupled to the serial register recirculating memory 133. The output of the pseudo-random generator 131 is coupled to the input of a 10-bit adder 132.

Each time the envelope update pulse on line 65 strobes the generator 131, the word on the output of the generator 129 is placed on the input of the adder 132.

The output of the generator 131 is a five-bit word, including four-bits of amplitude modulation data and one-bit of sign data, with the sign data included as the most significant bit. The five bits are coupled to the five least significant bit positions of the 10-bit adder 132. The 10-bit adder 132 provides ample expansion room for adding to the word placed at the input of the adder.

As the first word is strobed into the adder 132 by the envelope update pulse on lead 65, the word is set in the serial register 133. The register 133 includes 16 banks of ten parallel-connected flip-flops each. The clock input of each flip-flop is coupled to the envelope update lead 65, and when the first envelope update pulse strobes the first bank of flip-flops, the word on the output of generator 129 (and 131) is set in that bank, since generator 131 is slaved to the output of generator 129 on the first count. Upon the second strobe by an envelope update pulse, the word in the first bank transfers to the second bank, and the first random word out of the generator 131 is set in the first bank. The output of the memory 133, i.e., the last bank, is coupled to the input of the adder 132, but nothing is added until the sixteenth strobe pulse on lead 65. Just prior to the occurence of the 16th strobe pulse, 16 random words are stored in the memory 133, one in each bank. Upon the 16th pulse, the first word adds to the output of the generator 131. Since a bandwidth 17 pulse on line 52 occurs shortly after the occurrence of the 16th envelope update pulse, it is coupled to the reset inputs of the generator 131 and resets the generator such that the random generator 131 starts over on the same random cycle, thus each of the words recycled to the input of the adder 132 is added to itself. The output of the random generator 129, 131 can be positive or negative, thus the recirculated signals are added algebraically. Upon the occurrence of each 25th bandwidth 17 marker, the output of generator 129 changes, and a new reference is applied to the input of generator 131, but the output of the memory 133 is not reset to zero at this time, therefore a completely new random pattern is established.

The output of the memory 133 is coupled to the input of the eight-bit adder 78 and operates thus to jitter, in response to the random output of the memory, the sine data being generated for use in the table of channel bandwidths 90.

The jitter thus produced shows up in the output of the synthesizer 10 as noise, but the noise is carefully controlled, as described, to equalize the amount of noise associated with each frequency and with each respective piece of amplitude information. No particular harmonic in each band is unduly enhanced. The result which follows is that the intelligibility and quality of the speech produced is substantially enhanced by adding back to the voice signals otherwise produced a synthesized unvoiced sound which very closely approximates the original unvoiced speech.

It will be evident that various modifications are possible in the manner of practicing the invention and in the arrangement and construction of signal synthesizing devices. Accordingly, it should be understood that the form of the present invention described above and shown in the accompanying drawings are illustrative only and not intended to limit the scope of the invention.

What is claimed is:

1. A noise signal generator in a voice synthesizer receiving a bit stream input containing frames of voice frequency information bits and corresponding frames of spectrum-segment amplitude information bits along with frames of unvoiced frequency information bits and corresponding frames of spectrum-segment amplitude information bits, comprising:

means for generating sine data for an unvoiced frequency represented by the unvoiced information bits of a frame and each harmonic thereof up to an upper limit for each of a plurality of successive time periods, means for randomly modifying the generated sine data for each frame of unvoiced frequency information bits to vary said sine data in a pseudo-random manner, means for combining the pseudo-random modified sine data for the unvoiced frequency and each of the harmonics thereof with the corresponding spectrum-segment information bits for each of the plurality of successive time periods to generate a plurality of data words individually representing a segment of an output noise signal, and means for combining the plurality of data words into a noise signal.

2. A noise signal generator in a voice synthesizer as set forth in claim 1 wherein said means for generating sine data includes means for comparing selected bandwidths with the generated harmonics, and means for generating a bandwidth marker pulse at the completion of the comparision of the selected bandwidth with the unvoiced frequency and the generated harmonics.

3. A noise signal generator in a voice synthesizer as set forth in claim 2 wherein said means for randomly modifying the generated sine data includes a pseudo-random generator gėnerating an output that varies in response to the bandwidth marker pulses.

4. A noise signal generator in a voice synthesizer as set forth in claim 3 wherein said means for randomly modifying the generated sine data further includes a second pseudo-random generator coupled to the output of said first pseudo-random generator for further randomizing the generated sine data.

5. A noise signal synthesizer as set forth in claim 1 wherein said means for randomly modifying the generated sine data includes means for combining a randomly generated signal with the generated sine data.

6. A noise signal generator in a voice synthesizer receiving a bit stream input containing frames of voice frequency information bits and corresponding frames of spectrum-segment amplitude information bits along with frames of unvoiced frequency information bits and corresponding frames of spectrum-segment amplitude information bits, comprising:

counter means responsive to a bandwidth marker pulse generator at the completion of the comparision of selected bandwidths with an unvoiced frequency and harmonics thereof up to an upper limit, an adder-accumulator connected to said counter means and responsive to a signal generated for the unvoiced fundamental frequency and each harmonic thereof, a random signal means responsive to the bandwidth marker pulses for generating a signal that varies randomly with time, adder means responsive to the output of said random signal means and said adder-accumulator for generating sine data for the unvoiced frequency represented by the unvoiced information bits of a frame and each harmonic thereof up to the upper limit for each of a plurality of successive time periods, means for combining the random modified sine data at the output of said adder means for the unvoiced frequency and each of the harmonics thereof with the corresponding spectrum-segment information bits for each of the plurality of successive time periods to generate a plurality of data words individually representing a segment of an output noise signal, and means for combining the plurality of data words into a noise signal.

7. A noise signal generator in a voice synthesizer as set forth in claim 6 wherein said random signal means includes a pseudo-random generator responsive to the bandwidth marker pulses and having an output that varies in a pseudo-random manner with time.

8. A noise signal generator in a voice synthesizer as set forth in claim 7 wherein said random signal means includes a second pseudo-random generator coupled to the output of said first pseudo-random generator for further randomizing the output of said noise generator with time.

9. A noise signal generator in a voice synthesizer as set forth in claim 8 wherein said random signal means includes a counter responsive to the bandwidth marker pulses for advancing said first pseudo-random generator.

10. A noise signal generator in a voice synthesizer as set forth in claim 8 including adder means connected to the output of said second pseudo-random generator, and a recirculating memory interconnected to said adder and producing the output signal that varies in a pseudo-random manner with time.

11. A noise signal generator in a voice synthesizer receiving a bit stream input containing frames of voice frequency information bits and corresponding frames of spectrum-segment amplitude information bits along with frames of unvoiced frequency information bits and corresponding frames of spectrum-segment amplitude information bits, comprising:

means for detecting the unvoiced frequency information bits from the received bit stream, means responsive to said means to provide a preselected fundamental frequency signal, means for generating a bandwidth marker pulse at the completion of a comparison of selected bandwidths with the fundamental frequency and harmonics thereof up to an upper limit, means for generating sine data associated with the fundamental frequency and each harmonic thereof for each of a plurality of successive time periods, means for randomly modifying the generated sine data in response to the bandwidth marker pulses for each frame of the unvoiced frequency information bits to vary the sine data in a pseudo-random manner, means for combining the pseudo-random modified sine data for the unvoiced frequency and each of the harmonics thereof with the corresponding spectrum-segment information bits for each of the plurality of successive time periods to generate a plurality of data words individually representing a segment of an output noise signal, and means for combining the plurality of data words into a noise signal.

12. A noise signal generator in a voice synthesizer as set forth in claim 11 wherein said means for randomly modifying the generated sine data includes a pseudo-random generator responsive to the bandwidth marker pulse for generating an output that varies in a pseudo-random manner with time.

13. A noise signal generator in a voice synthesizer as set forth in claim 12 wherein said means for randomly modifying the generated sine data further includes a second pseudo-random generator coupled to the output of said first pseudo-random generator for further randomizing of the generated sine data.

14. A noise signal generator in a voice synthesizer as set forth in claim 13 wherein said means for generating sine data includes:

a counter responsive to the bandwidth marker pulses, an adder-accumulator connected to said counter and responsive to a signal generated for each comparison of a selected bandwidth with the fundamental frequency and the harmonics thereof, and adder means connected to the output of said adder-accumulator and to said means for randomly modifying the generated sine data for combining the output of said latter means with the output of said adder-accumulator.

* * * * *